United States Patent
Py

(10) Patent No.: US 9,573,741 B2
(45) Date of Patent: Feb. 21, 2017

(54) CO-EXTRUSION BLOW MOLDING APPARATUS AND METHOD, AND SEALED EMPTY DEVICES

(76) Inventor: Daniel Py, Larchmont, NY (US)

(*) Notice: Subject to any disclaimer, the term of this patent is extended or adjusted under 35 U.S.C. 154(b) by 1150 days.

(21) Appl. No.: 12/577,104

(22) Filed: Oct. 9, 2009

(65) Prior Publication Data
US 2010/0094245 A1    Apr. 15, 2010

Related U.S. Application Data

(60) Provisional application No. 61/104,649, filed on Oct. 10, 2008.

(51) Int. Cl.
| | |
|---|---|
| *A61J 1/05* | (2006.01) |
| *B65D 55/08* | (2006.01) |
| *B29C 49/04* | (2006.01) |
| *B65D 1/02* | (2006.01) |
| *B65D 77/06* | (2006.01) |
| *A61J 1/14* | (2006.01) |
| *B29C 47/00* | (2006.01) |
| *B29C 49/22* | (2006.01) |
| *B29C 65/66* | (2006.01) |
| *B29C 65/00* | (2006.01) |
| *B29K 101/12* | (2006.01) |
| *B29L 31/56* | (2006.01) |
| *B67C 3/22* | (2006.01) |

(52) U.S. Cl.
CPC ............. *B65D 55/0818* (2013.01); *A61J 1/05* (2013.01); *B29C 49/04* (2013.01); *B65D 1/0223* (2013.01); *B65D 77/06* (2013.01); *A61J 1/1406* (2013.01); *B29C 47/003* (2013.01); *B29C 47/004* (2013.01); *B29C 49/22* (2013.01); *B29C 65/665* (2013.01); *B29C 66/7371* (2013.01); *B29C 2791/001* (2013.01); *B29C 2793/0027* (2013.01); *B29K 2101/12* (2013.01); *B29L 2031/565* (2013.01); *B65D 2501/0036* (2013.01); *B67C 2003/227* (2013.01)

(58) Field of Classification Search
CPC ... B65D 55/0818; B65D 1/0223; B65D 77/06; A61J 1/05; B29C 49/04
USPC ............. 604/317, 403; 53/453; 222/95, 105; 215/251
See application file for complete search history.

(56) References Cited

U.S. PATENT DOCUMENTS

| | | |
|---|---|---|
| 3,423,495 A | 1/1969 | Bachner |
| 3,712,784 A | 1/1973 | Siard et al. |

(Continued)

FOREIGN PATENT DOCUMENTS

| | | |
|---|---|---|
| EP | 0 644 035 A1 | 3/1995 |
| EP | 0 958 909 A1 | 11/1999 |

OTHER PUBLICATIONS

Topas Advanced Polymers, Inc., "Topas (R) Cyclic Polyolefin Copolymer (COC)" (2006), www.topas.com, p. 16.*

(Continued)

*Primary Examiner* — Leslie Deak
*Assistant Examiner* — Kai Weng
(74) *Attorney, Agent, or Firm* — McCarter & English, LLP

(57) ABSTRACT

A device comprising a body including a first polymer and a closure including a second polymer that is substantially not bondable to the first polymer and has a relatively higher shrinkage rate than the first polymer, wherein at least a portion of the closure overlaps at least a portion of the body, forming a hermetic seal therebetween and defining a sealed, empty, sterile container.

32 Claims, 17 Drawing Sheets

(56) References Cited

U.S. PATENT DOCUMENTS

| | | | |
|---|---|---|---|
| 3,814,783 | A | 6/1974 | Dardaine et al. |
| 4,015,401 | A | 4/1977 | St. Amand et al. |
| 4,026,982 | A | 5/1977 | Dardaine et al. |
| 4,266,927 | A | 5/1981 | Gilbert et al. |
| 4,401,423 | A | 8/1983 | Bellehache et al. |
| 4,419,323 | A | 12/1983 | Winchell |
| 4,496,362 | A | 1/1985 | Leurink et al. |
| 4,671,763 | A | 6/1987 | Weiler |
| 4,824,618 | A | 4/1989 | Strum et al. |
| 4,946,366 | A | 8/1990 | Dundas et al. |
| 4,948,356 | A | 8/1990 | Dundas et al. |
| 4,950,153 | A | 8/1990 | Dundas et al. |
| 5,037,684 | A | 8/1991 | Dundas et al. |
| 5,068,075 | A | 11/1991 | Dundas et al. |
| 5,332,121 | A | 7/1994 | Schmidt et al. |
| 5,531,060 | A | 7/1996 | Fayet et al. |
| 5,669,208 | A | 9/1997 | Tabaroni et al. |
| 5,687,550 | A | 11/1997 | Hansen et al. |
| 5,921,430 | A | 7/1999 | Hansen et al. |
| 6,173,852 | B1 | 1/2001 | Browne |
| 6,315,939 | B1 | 11/2001 | Mock et al. |
| 6,562,281 | B1 | 5/2003 | Marchau et al. |
| 6,579,082 | B2 | 6/2003 | Castellari |
| 6,692,684 | B1 | 2/2004 | Nantin et al. |
| 6,808,681 | B2 | 10/2004 | Bjerborn |

OTHER PUBLICATIONS

Misumi USA, "#028 Mold Shrinkage Ratios of Major Plastic Materials" (2013), http://www.misumi-techcentral.com/tt/en/mold/2010/02/028-molding-shrinkage-ratios-of-major-plastic-materials.html, pp. 1-2.*

International Preliminary Report on Patentability for PCT/US2009/060278 dated Apr. 21, 2011.

International Search Report mailed Nov. 30, 2009 in International Application No. PCT/US09/60278.

Supplementary European Search Report for European Application No. EP 09 82 0007, dated Mar. 27, 2012.

* cited by examiner

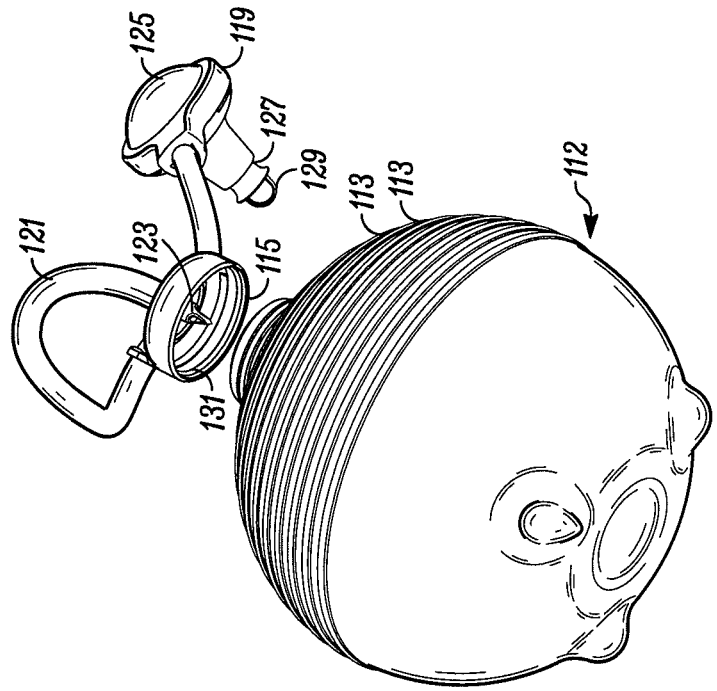
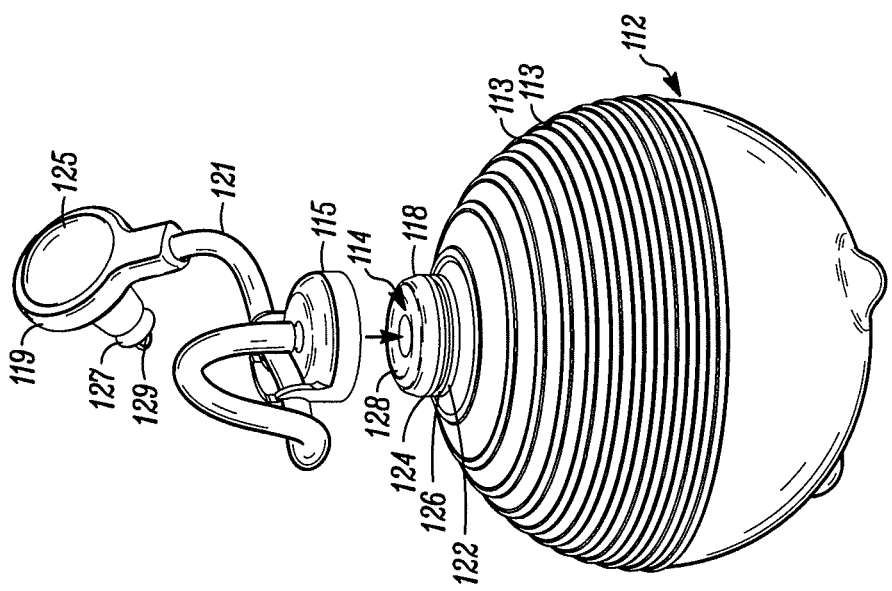

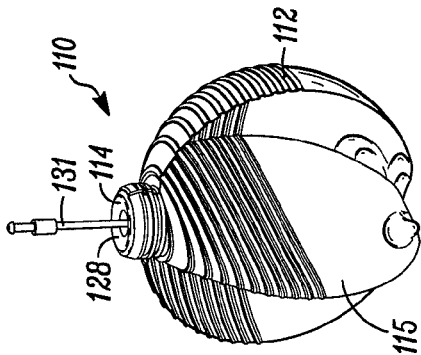
FIG. 7A
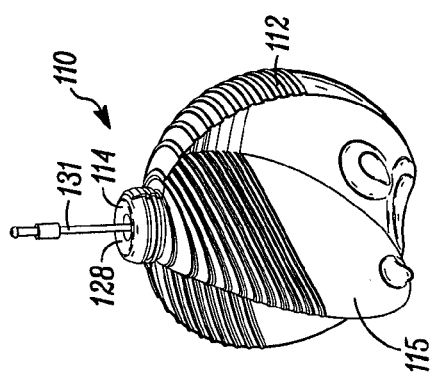
FIG. 7B
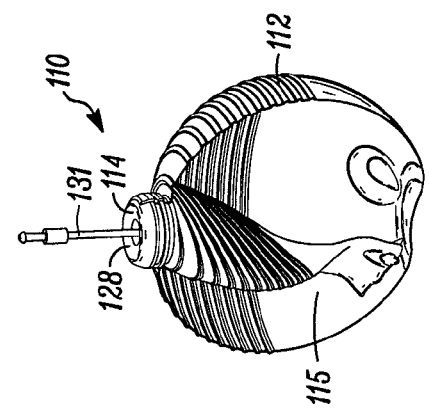
FIG. 7C
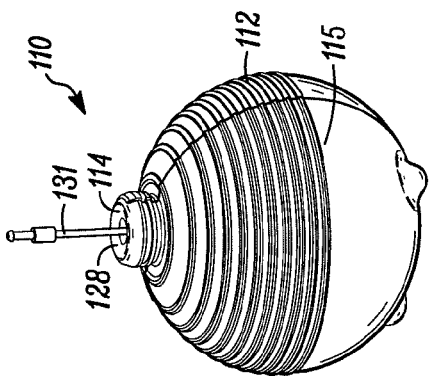
FIG. 7D
FIG. 7E
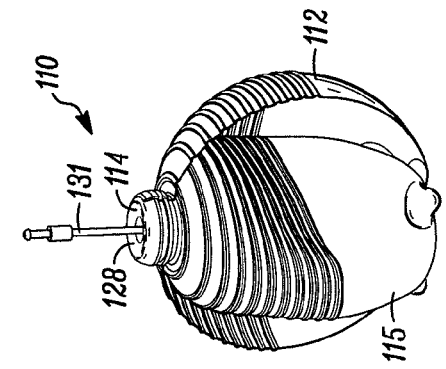
FIG. 7F

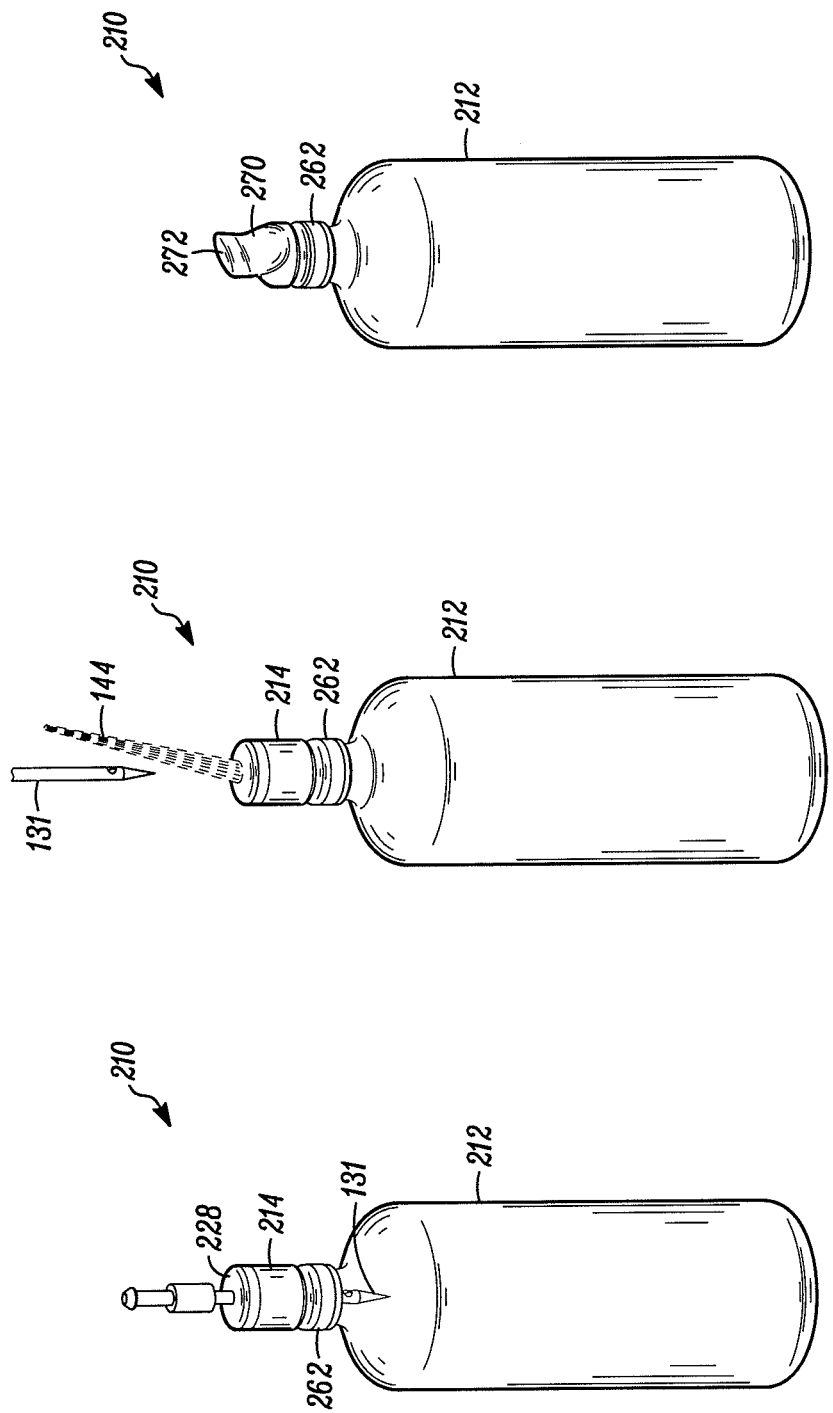

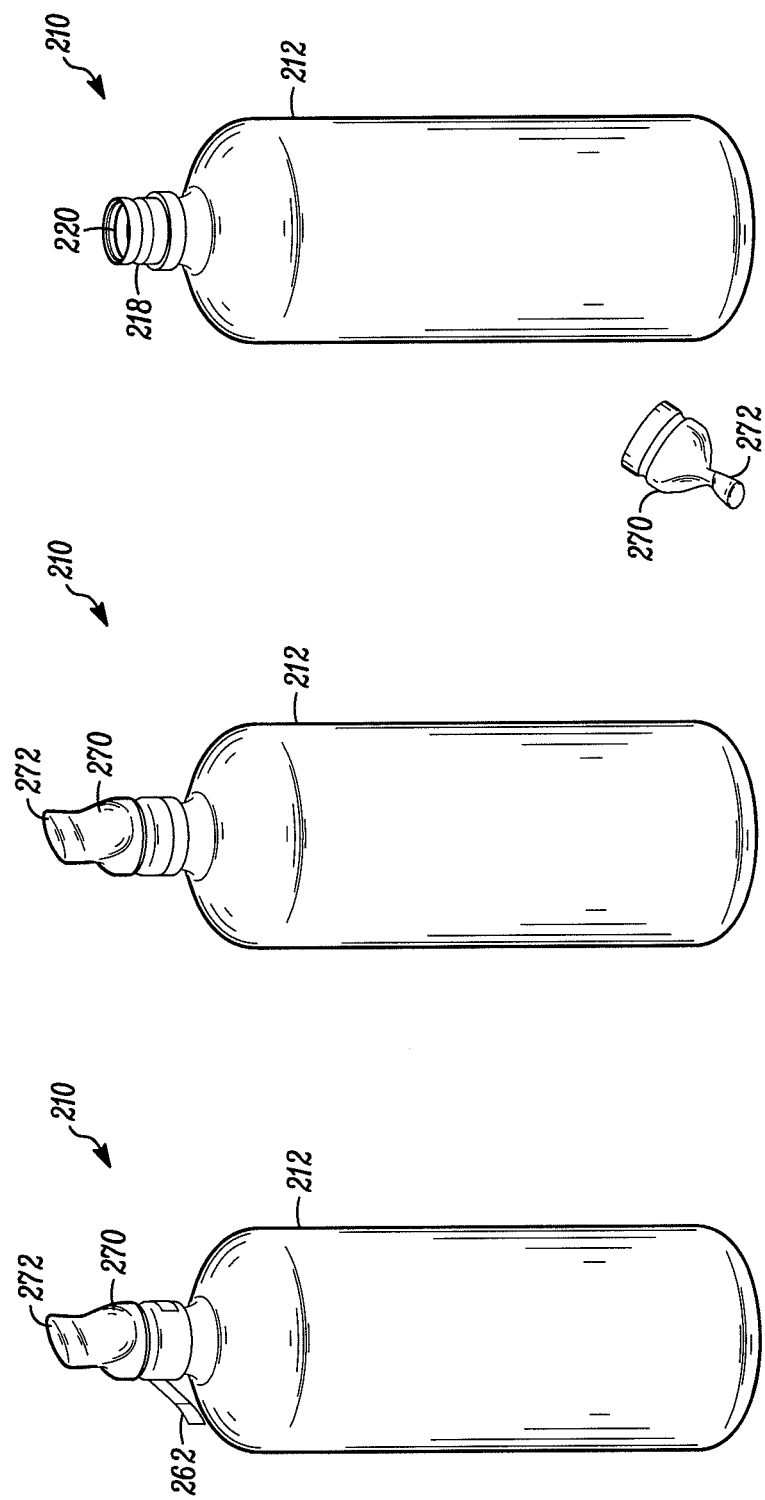

CO-EXTRUSION BLOW MOLDING APPARATUS AND METHOD, AND SEALED EMPTY DEVICES

This patent application claims priority to U.S. Provisional Patent Application Ser. No. 61/104,649, filed Oct. 10, 2008, entitled "Co-Extrusion Blow Molding Apparatus and Method, and Sealed Empty Devices," which is hereby incorporated by reference in its entirety as part of the present disclosure.

BACKGROUND OF THE INVENTION

Field of the Invention

The present invention relates to blow molding methods and apparatus and to blow molded devices, such as sealed containers, and more particularly, to apparatus and methods for blow molding sealed, empty devices such as by co-extrusion blow molding.

Background Information

One of the drawbacks of current devices for storing products, such as food or medicinal products, is that multiple parts of the devices must be manufactured separately, such as by molding, and then assembled together. This can be particularly time consuming and expensive when the devices are used for storing sterile food products, medicinal products, or other products requiring sterile filling and/or that must be sealed with respect to ambient atmosphere during storage and/or use of the devices. For example, with devices including removable closures, the closures and bodies must be created separately, and then sterilized, sterile filled, and assembled in a sterile isolator. These multiple assembly steps can be time consuming, the maintenance and use of a sterile isolator for assembling and filling can be complicated and expensive, and overall the assembly, sterilizing and filling processes can subject the devices and/or sterile filled products to an undesirable risk of contamination.

Accordingly, it is an object of the present invention to overcome one or more of the above-described drawbacks and/or disadvantages of the prior art.

SUMMARY OF THE INVENTION

In accordance with a first aspect, the present invention is directed to a device comprising a body including a first polymer and defining a chamber, and a closure including a second polymer that is substantially not bondable to the first polymer. At least one of the first and second polymers exhibits a higher shrinkage rate relative to the other; and at least a portion of the closure overlaps at least a portion of the body, forming a hermetic seal therebetween, and defining a sealed, empty, sterile chamber within the body.

In some embodiments of the present invention, the body and closure are co-extrusion blow-molded. In some embodiments, the closure includes a pierceable and resealable septum. In some such embodiments, the pierceable and resealable septum includes a third polymer that is bondable to the second polymer of the closure.

In some embodiments of the present invention, the body defines a first portion including the first polymer and further comprises a third portion including a third polymer that is relatively flexible in comparison to the first polymer and is substantially not bondable to the first polymer. A chamber is hermetically sealable with respect to ambient atmosphere and is defined by (i) an interior of the third portion, or (ii) a space formed between the first and third portions.

In some embodiments of the present invention, the device further comprises a one-way valve fixedly secured to the body and/or closure and in fluid communication with the interior of the body. The one-way valve defines a normally closed position that hermetically seals the chamber with respect to the ambient atmosphere, and an open position that allows an aseptic filled product to flow out of the chamber through the one-way valve. In some such embodiments, the one-way valve substantially prevents the ingress of bacteria and other contaminants into the chamber in both the closed and open positions. In some such embodiments, the one-way valve includes a flexible valve member that is movable from the closed to the open position in response to substance at an inlet to the one-way valve exceeding a valve opening pressure.

In accordance with another aspect, the present invention is directed to a device comprising a body; and a penetrable and thermally resealable portion co-extrusion blow molded with the body. The body and penetrable and thermally resealable portion cooperate to define a sealed, empty, sterile chamber.

Some embodiments of the present invention further comprise a closure defining the penetrable and thermally resealable portion. In some such embodiments, the body includes a first polymer; and the closure includes a second polymer that is substantially not bondable to the first polymer. At least one of the first and second polymers exhibits a higher shrinkage rate relative to the other. In addition, at least a portion of the closure overlaps at least a portion of the body, forming a hermetic seal therebetween, and defining a sealed, empty, sterile chamber within the body.

In accordance with another aspect, the present invention is directed to a method comprising the following steps:

(i) extruding a body including a first polymer;

(ii) co-extruding with the body a closure that includes a second polymer that is substantially not bondable to the first polymer, wherein at least one of the first and second polymers exhibits a higher shrinkage rate relative to the other; and (iii) blow molding the co-extruded body and closure and forming therein an empty, sterile chamber that is sealed with respect to ambient atmosphere.

Some embodiments of the present invention further comprise cooling the blow molded body and closure and, in turn, inducing shrinkage of the first and second polymers to form a hermetic seal therebetween. Some embodiments of the present invention further comprise co-extruding a third portion of the device including a third polymer that is bondable to the second polymer. Some such embodiments further comprise co-extrusion blow molding the first, second and third portions. Some embodiments further comprise sequentially co-extruding the first and second polymers. Some such embodiments further comprise extruding a first parison of the first polymer, and sequentially co-extruding a second parison of the second polymer surrounding the first parison. Some embodiments further comprise sequentially co-extruding the first, second and third polymers and, in turn, fixedly securing the first and second portions to each other and bonding the third polymer to the second polymer.

Some embodiments of the present invention further comprise aseptically filling the sealed, empty, device with a sterile fluid. In some such embodiments, the sterile fluid is at least one of a food and a medicine. In some such embodiments, the food is at least one of a milk-containing product, a soy-containing product, a non-dairy creamer, a yogurt-containing product, a fat-containing product, a nutritional supplement-containing product, and a low acid product. In some embodiments, the aseptic filling includes needle penetrating a penetrable portion of the device with an injection member and aseptically filling the chamber through the injection member. Some such embodiments further comprise thermally resealing a resulting fill hole. In other embodiments, the aseptic filling includes (i) detaching the closure from the body, (ii) filling the chamber with a fluid through a cannula, (iii) re-attaching the closure to the body, and wherein steps (i) through (iii) are performed under an overpressure of sterile gas.

In accordance with another aspect, the present invention is direct to a method comprising the following steps:
 (i) extruding a body including a first polymer;
 (ii) co-extruding with the body a penetrable and resealable portion that includes a second polymer that is bondable to the first polymer; and
 (iii) blow molding the co-extruded body and resealable portion and forming therein an empty, sterile chamber that is sealed with respect to ambient atmosphere.

Some embodiments further comprise co-extruding with the body and penetrable portion a closure that includes a third polymer that is substantially not bondable to the first polymer, wherein at least one of the first and third polymers exhibits a higher shrinkage rate relative to the other. In some embodiments, the second polymer is bondable to the first and third polymers.

One advantage of the currently preferred embodiments of the present invention is that the body and removable closure can be molded at the same time as one part. Yet another advantage of some currently preferred embodiments of the present invention is that the co-extruded body and closure form and maintain a sealed, empty and sterile container.

Other advantages of the present invention and/or of the preferred embodiments thereof will become more readily apparent in view of the following detailed description of the currently preferred embodiments and accompanying drawings.

BRIEF DESCRIPTION OF THE DRAWINGS

FIGS. 4A and 4B are partially exploded, perspective views of the device of FIG. 2 illustrating assembly of the valve, pump and tube assembly to the sealed, empty ball and bladder assembly.

FIGS. 7A-7F are perspective, partial cross sectional views of the device of FIG. 2 illustrating the steps for aseptic needle filling the flexible inner bladder through the co-molded, needle penetrable septum.

FIGS. 16A-16B are perspective views of the device of FIG. 9 illustrating withdrawal of the filling needle from the closure septum and laser sealing of the resulting needle hole to hermetically seal the aseptically filled product within the device chamber.

FIG. 16C is a perspective view of the device of FIG. 9 illustrating the steps involved in applying an over cap to the needle penetrable and laser resealed closure to protect the closure and later facilitate manual gripping and removal of the closure to dispense product from the device.

FIGS. 17A-17C are perspective views of the device of FIG. 9 illustrating the steps involved in removing the tamper evident tape from the interface of the closure and body neck, and removal of the over cap by gripping the pull tab to open the device and dispense the filled product therefrom.

DETAILED DESCRIPTION OF EMBODIMENTS OF THE INVENTION

Figure 1B:
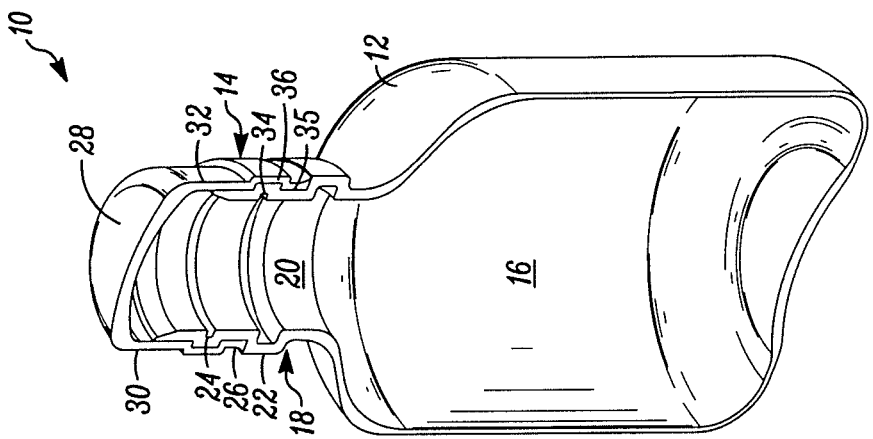
FIG. 1B is a perspective, cross sectional view of the device of FIG. 1A.
Figure 1A:
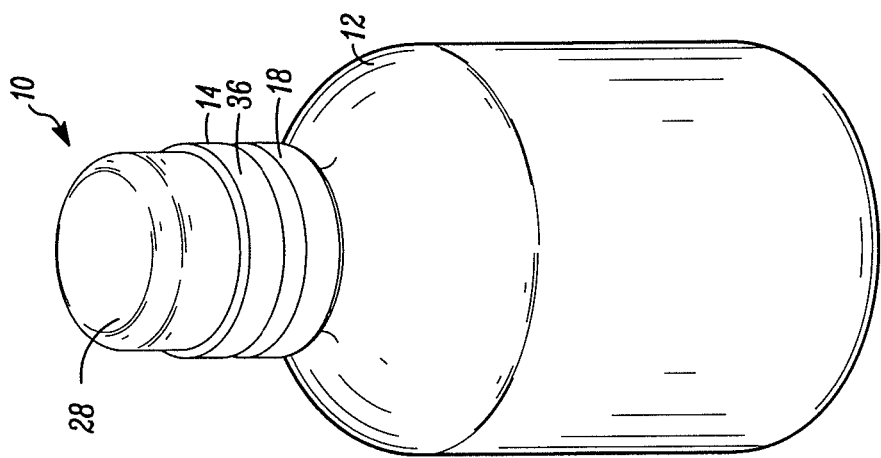
FIG. 1A is a perspective view of a first embodiment of a device of the present invention including a co-extrusion, blow molded body and closure forming a sealed, empty sterile container, wherein the closure is detachable from the body to sterile fill the chamber in the body of the container, and is re-attachable to the body to hermetically seal the sterile filled product within the container.

In FIGS. 1A and 1B, a device embodying the present invention is indicated generally by the reference numeral 10. In the illustrated embodiment, the device 10 includes a body 12 including a first polymer, and a closure 14 that includes a second polymer that is substantially not bondable to, and has a relatively higher shrinkage rate than, the first polymer. As shown best in FIG. 1B, the body 12 defines an interior chamber 16 and includes a neck 18 defining a filling and dispensing aperture 20. The neck 18 defines first and second annular flanges 22 and 24, respectively, that are axially spaced relative to each other, and an annular groove 26 extending axially therebetween. The closure 14 is defined by an upper wall 28 and an annular flange 30 depending therefrom. As can be seen, a portion 32 of the annular flange 30 overlaps a portion 34 of the neck 18. The overlapping portion 32 of the closure 14 defines an annular groove 36 that receives therein the second annular flange 24 of the neck 14, and defines an annular flange 35 that is received within the annular groove 26 of the neck. Due to the relatively higher shrinkage rate of the material forming the closure 14 in comparison to the material forming the neck 18, the overlapping portions 32 and 34 of the closure and neck, respectively, are compressed into engagement with each other at the time of formation, as described further below, and form a hermetic seal therebetween. As also described further below, in the illustrated embodiment, the body and closure 12 and 14, respectively, are co-extruded, and preferably are sequentially co-extrusion blow-molded. As a result, the chamber 16 of the device is hermetically sealable with respect to ambient atmosphere. In addition, as described further below, because the first polymer is substantially not bondable to the second polymer, the closure 14 is detachable from the neck 18 to aseptically fill the empty chamber 16, and is re-attachable to the neck 18 to secure the closure 14 to the neck and form a hermetic seal therebetween. The flanges 22, 24 of the neck 18 interlock with the groove 36 and flange 35 of the closure 14 and, in turn, releasably retain the closure to the neck while forming a hermetic seal therebetween. As may be recognized by those of ordinary skill in the pertinent art based on the teachings herein, the device may include any of numerous other structures, features or devices that are currently known, or that later become known, for releasably retaining the closure to the body and forming a hermetic seal therebetween.

In FIGS. 2 through 8, another embodiment of a device of the present invention is indicated generally by the reference numeral 110. The device 110 is substantially similar to the device 10 described above, and therefore like reference numerals preceded by the numeral "1" as used to indicated like elements. A primary difference of the device 110 in comparison to the device 10 is that the device 110 includes a relatively rigid, ball-shaped outer body 112, a co-extrusion, blow molded, relatively flexible inner bladder 115 forming a sealed, variable-volume storage chamber 116, and a one-way valve 127, pump 125 and tube 121 assembly connected to the inner bladder 115 for dispensing substantially metered doses of sterile filled product therefrom, as hereinafter described.

Figure 2:
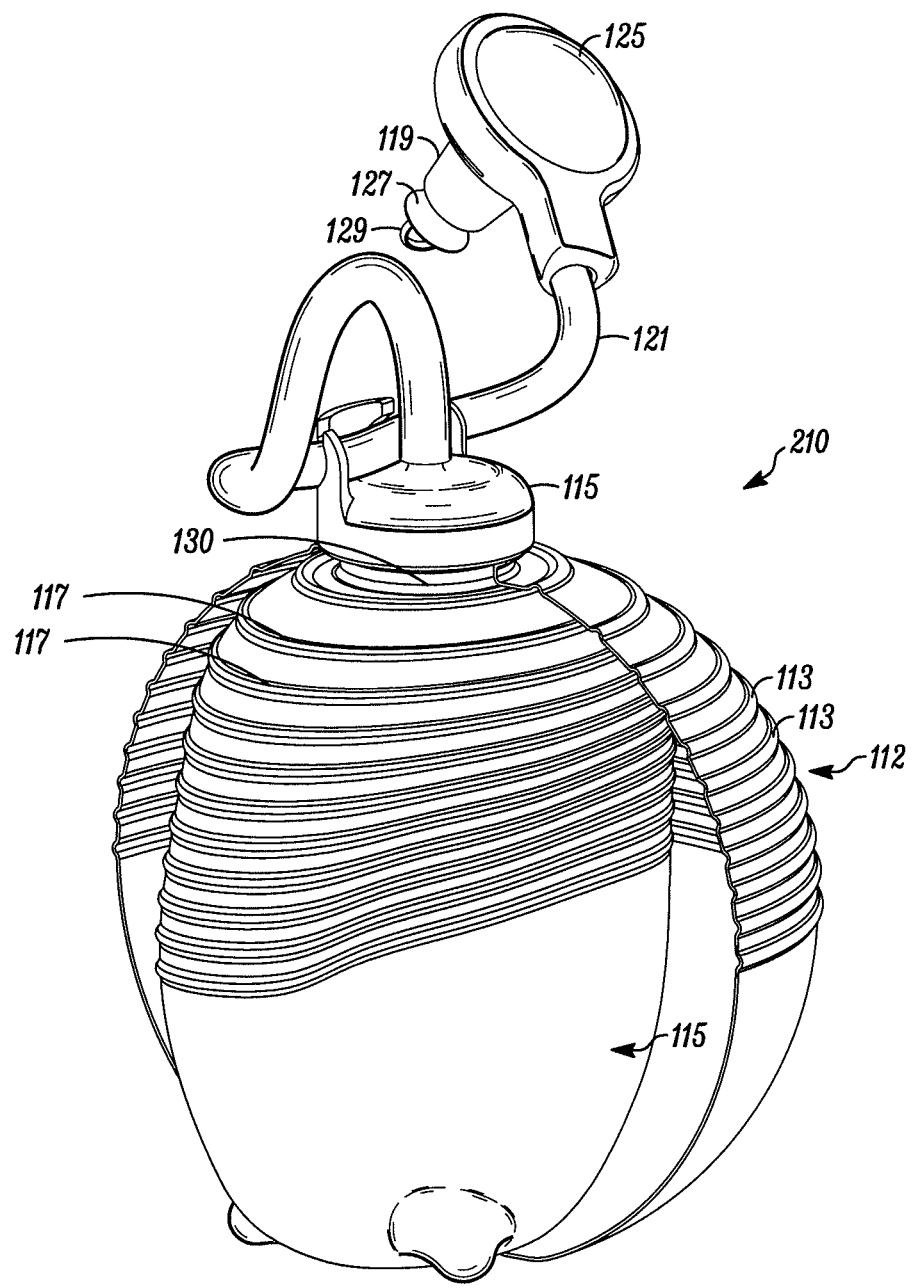
FIG. 2 is a perspective, partial cross-sectional view of a second embodiment of a device of the present invention including a relatively rigid, ball-shaped outer body, a co-extrusion, blow molded, relatively flexible inner bladder forming a sealed, variable-volume storage chamber, and a one-way valve, pump and tube assembly connected to the inner bladder for dispensing substantially metered doses of sterile filled product therefrom.
Figure 3:
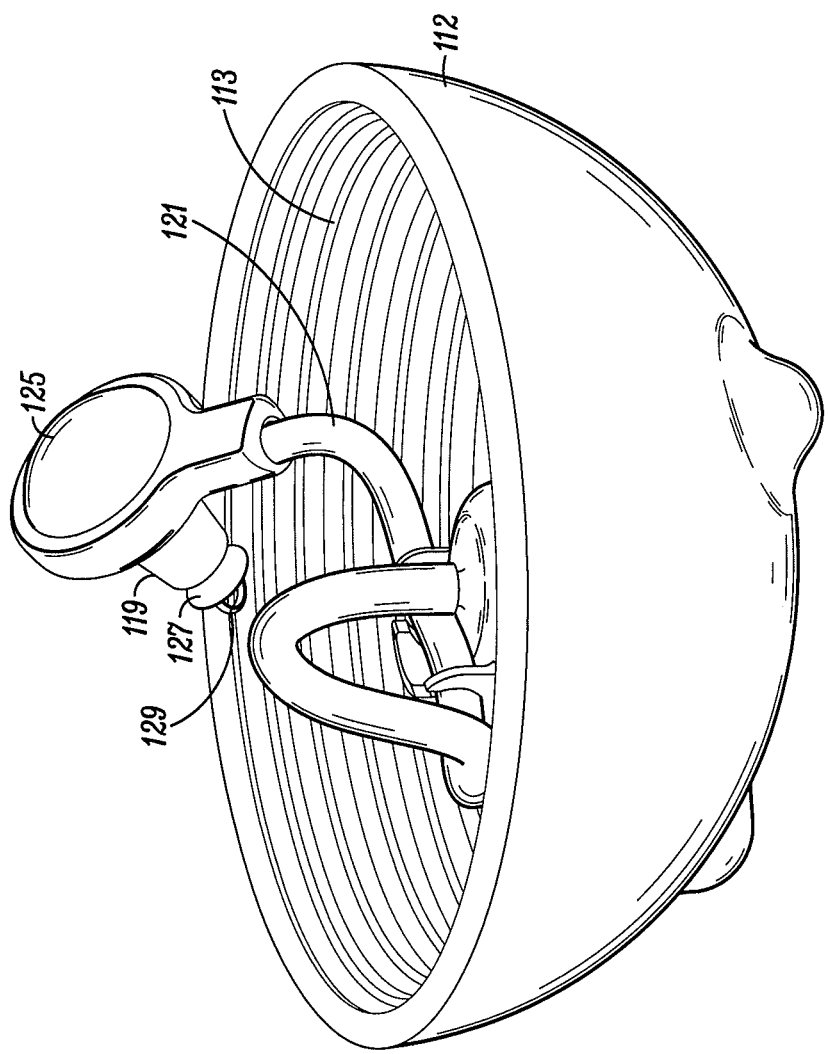
FIG. 3 is a perspective view of the device of FIG. 2 showing the device in a substantially emptied condition wherein an upper portion of the relatively rigid outer container is collapsed inwardly on itself and on the flexible inner bladder after the product is dispensed from the variable-volume storage chamber of the bladder.

As shown in FIGS. 2-4, the device 110 defines a relatively rigid, substantially spherical-shaped outer body 112 defining in the upper hemispherical portion thereof a plurality of annular pleats 113 that are axially spaced relative to each other. As shown typically in FIG. 3, the pleats 113 allow the upper hemispherical portion of the outer body 112 to invert or fold inwardly on itself upon dispensing product from the flexible inner bladder. As shown best in FIG. 6, each pleat 113 is defined by an annular rib extending radially outwardly of outer body 112, and that forms a pivot allowing the outer body to be folded inwardly on itself at the respective pleat. As may be recognized by those of ordinary skill in the pertinent art based on the teachings herein, the term "pleat" is used to refer to, and may take the form of, any of numerous different structures or features that are currently known, or that later become known, that allow the outer body to collapse of fold inwardly on itself.

Figure 5A:
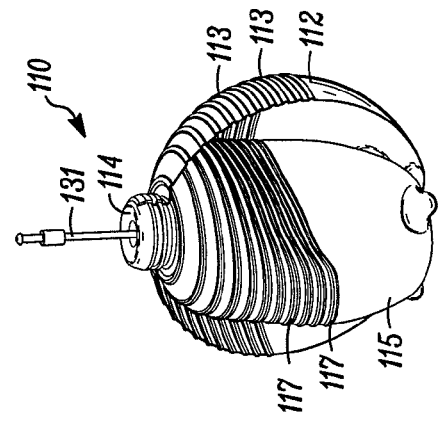
FIGS. 5A-5F are perspective, partial cross sectional views of the device of FIG. 2 illustrating the steps for needle filling the flexible inner bladder through the co-molded needle penetrable septum, and substantial evacuation of the inner bladder prior to aseptic needle filling thereof.
Figure 5B:
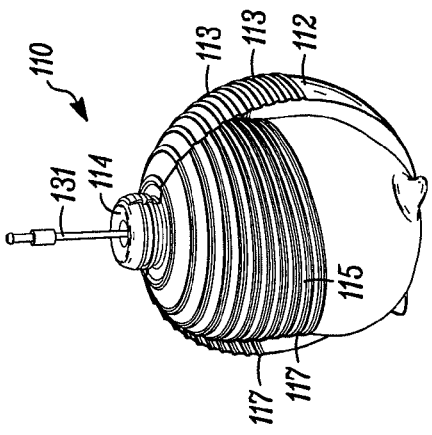
Figure 5C:
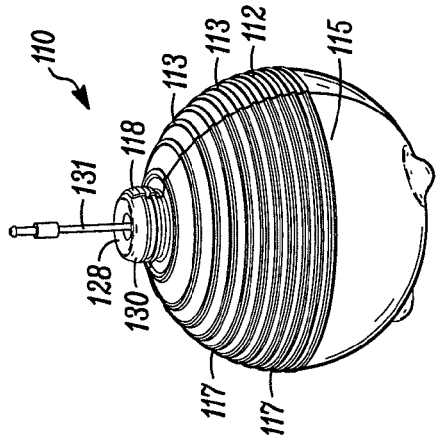
Figure 5D:
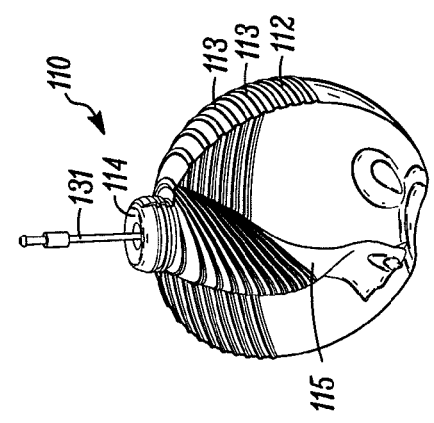
Figure 5E:
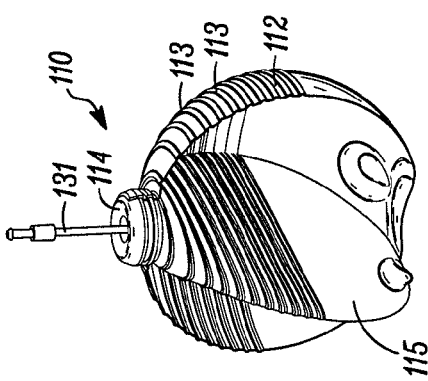
Figure 5F:
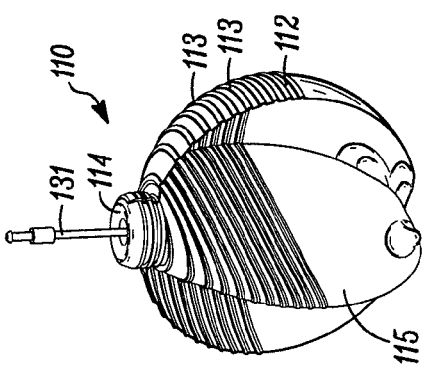
Figure 6:
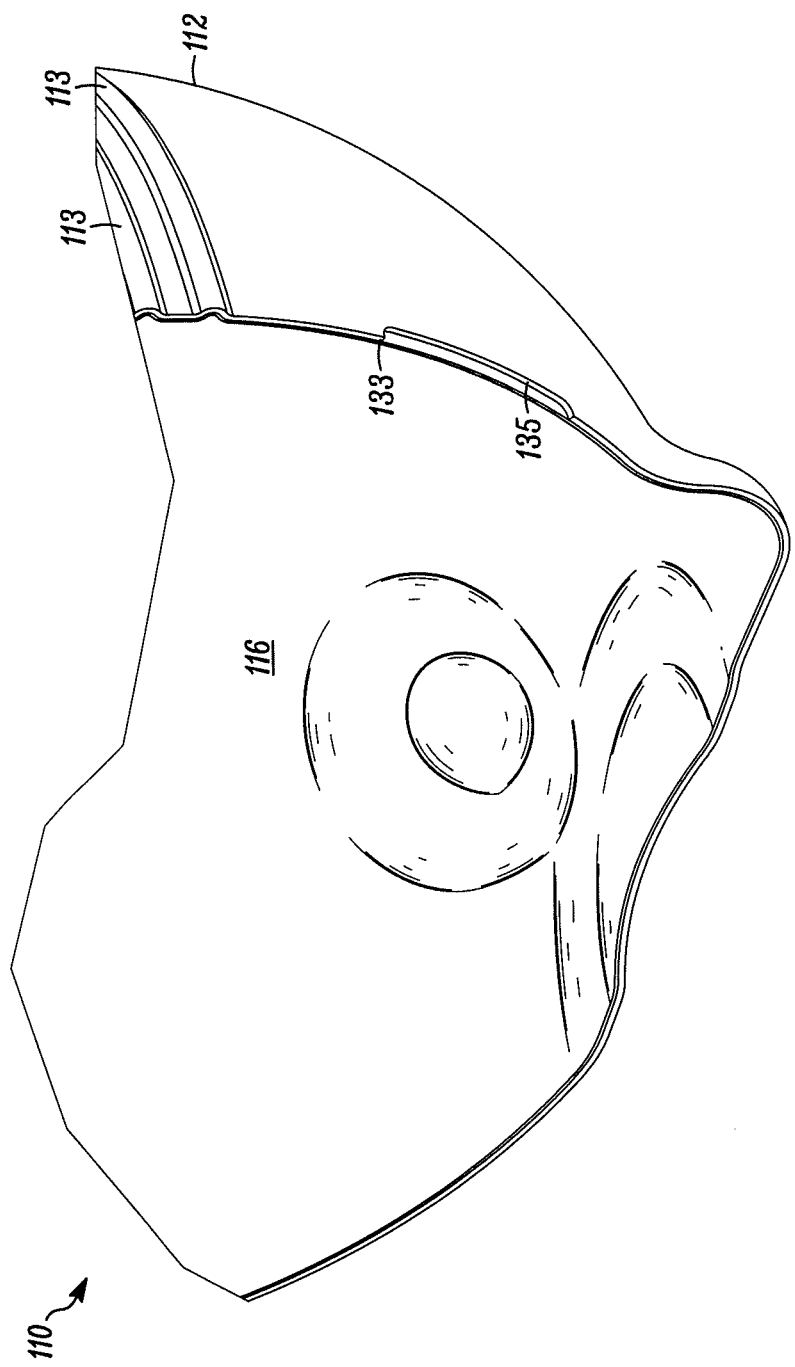
FIG. 6 is a partial, perspective, cross-sectional view of the device of FIG. 2 illustrating the formation of an aperture or like slit in the outer ball to allow the flow of air therethrough and into the space between the outer ball and flexible inner bladder.

The device 110 also includes a relatively flexible inner body 115 that defines a variable volume chamber 116 (FIG. 6). Like the outer body 112, the flexible inner body 115 is substantially spherical-shaped and defines in the upper hemispherical portion thereof a plurality of annular pleats 117 that are axially spaced relative to each other. As shown typically in FIGS. 5A through 5F, the inner body 115 is defined by a flexible bladder that is relatively flexible in comparison to the outer body 112. As shown typically in FIG. 3, the pleats 117 allow the upper hemispherical portion of the inner bladder 115 to invert or fold inwardly on itself upon dispensing product therefrom.

As shown typically in FIG. 4A, the outer body 112 defines an upwardly extending neck 118 receiving therein a closure 114. The neck 118 defines first and second annular flanges 122 and 124, respectively, and an annular grove 126 extending axially therebetween. The closure 114 defines a penetrable and thermally resealable septum 128 and an annular flange 130 depending therefrom (see FIG. 5A). As shown in FIG. 5A, the neck 118 overlaps the depending flange 130 of the closure 114 and is bonded thereto to form a hermetic seal therebetween. As also shown, the depending flange 130 of the closure 114 includes a corresponding recess and flanges that interlock with the recess and flanges of the neck 118 to further secure the closure to the neck. The depending flange 130 of the closure 114 is bonded (preferably by sequential co-extrusion molding, as described further below) to the upper portion of the flexible inner bladder 115 such that the closure 114 is formed integral with the inner bladder, and the inner bladder 115 is supported within the outer body 112, at least in part, by the closure. In the illustrated embodiment, the outer body 112 includes a first polymer, the flexible inner bladder 115 includes a second polymer that is not bondable to the first polymer of the outer body, and the closure 114 includes a third polymer that is bondable to the first polymer of the outer body 112 and to the second polymer of the inner bladder 115, such that upon co-extrusion blow molding the three components, the closure 114 is bonded to, and formed integral with both the neck 118 of the outer body 112 and the upper portion of the inner bladder 115 to fixedly secure, and hermetically seal, the inner bladder 115 within the outer body 112.

The device 110 further includes and a one-way valve 127, an actuator/pump 125 and a flexible tube 121 assembly connectable to the inner bladder 115 through the closure septum 128 for dispensing substantially metered doses of sterile filled product therefrom. The dome-shaped actuator and pump assembly 125 is manually engageable to depress the dome-shaped actuator and, in turn, pump a substantially predetermined volume of product from the inner bladder 115 through the one-way valve 127. A flexible tube 121 is connected between the inlet to the actuator/pump 125 and an over cap 115. As shown in FIGS. 4A and 4B, the over cap 115 includes a piercing member 123 defining a plurality of apertures therethrough in fluid communication with the tubular conduit 121 for piercing the hermetically sealed, resealable septum 128 of the closure 114 and, in turn, connecting the conduit 121 into fluid communication with the inner bladder 115. As shown in FIGS. 4A and 4B, the over cap 115 includes on an interior surface thereof an annular flange 131 that is engageable with the annular recess 126 of the neck 118 to fixedly secure the over cap to the neck. If the over cap is not attached to the closure 114 in the sterile filling machine, the over cap 115 may be provided in sterile packaging or may be provided with an overlay of foil, tape or like sealed covering (not shown) to maintain the piercing member sterile prior to piercing the closure, and the closure similarly may be provided with a foil, tape or like covering (not shown) that maintains the piercing surface sterile prior to piercing. If desired, a plug 129 may be received within the open end of the nozzle 119 at the outlet of the one-way valve 127 to protect the valve during transport and storage, and otherwise prevent any accidental dispensing of product through the valve during transport or storage.

In the illustrated embodiment, the one-way valve 127 maintains a hermetic seal between the interior of the device 110 and ambient atmosphere throughout any storage and usage of the valve. Accordingly, the one way valve 127, actuator/pump 125, and other components of the nozzle may take the form of any such components disclosed in any of the following patent applications and patents that are hereby incorporated by reference in their entireties as part of the present disclosure: U.S. patent application Ser. No. 11/650, 102, filed on Jan. 5, 2007, which claims priority to U.S. Provisional Patent Application 60/757,161, filed on Jan. 5, 2006; U.S. patent application Ser. No. 12/021,115, filed on Jan. 28, 2008; which is a continuation of United State patent application Ser. No. 11/295,251, filed on Dec. 5, 2005, now U.S. Pat. No. 7,322,491, which claims priority to U.S. Provisional Patent Applications 60/633,332 filed on Dec. 4, 2004 and 60/644,160 filed on Jan. 14, 2005; U.S. patent application Ser. No. 11/295,274, filed on Dec. 5, 2005, now U.S. Pat. No. 7,278,533; U.S. patent application Ser. No. 11/949,104, filed on Dec. 3, 2007, which is a continuation of U.S. patent application Ser. No. 11/900,335, filed on Sep. 10, 2007; U.S. patent application Ser. No. 11/900,227, filed on Sep. 10, 2007; U.S. patent application Ser. No. 11/900,332, filed on Sep. 10, 2007; U.S. provisional Patent Application No. 60/843,131, filed on Sep. 8, 2006.

As indicated above, the flexible inner body 115 is defined by a third polymer that is substantially not bondable to the polymer of the outer body 112. As shown best in FIGS. 5A-5F, the flexible inner body 115 is evacuated and made ready for fluid filling via a needle or like injection member 131 coupled in fluid communication with a vacuum source (not shown). As can be seen, a non-coring needle 131 is inserted through the penetrable septum 128 of the closure 114 to place the open end of the needle into the variable-volume storage chamber 116. Then, the vacuum source is activated to draw a vacuum through the needle and, in turn, draw air out of the variable volume chamber 116. As shown in FIG. 6, the flexible inner body 115 is able to collapse away from the outer body 112 because a slot 133 is formed in the body 112 that, in turn, allows ambient air to flow into the space between the inner and outer bodies. As shown in FIGS. 5A-5F, this in turn allows the flexible inner body 115 to collapse as its contents are evacuated. The slot 133 is formed by introducing an axially-elongated strip 135 in the shape of the desired slot formed of the same material as the inner bladder into the parison forming the outer body. The material forming the strip 135 and the inner bladder is comprised of a polymer that is substantially not bondable to the polymer of the outer body 112. As a result, the strip 135 does not bond to the outer body 112 during the extrusion and/or blow mold process, but does bond to the inner bladder 115, thus forming the resulting slot 133 in the outer body.

Figure 8:
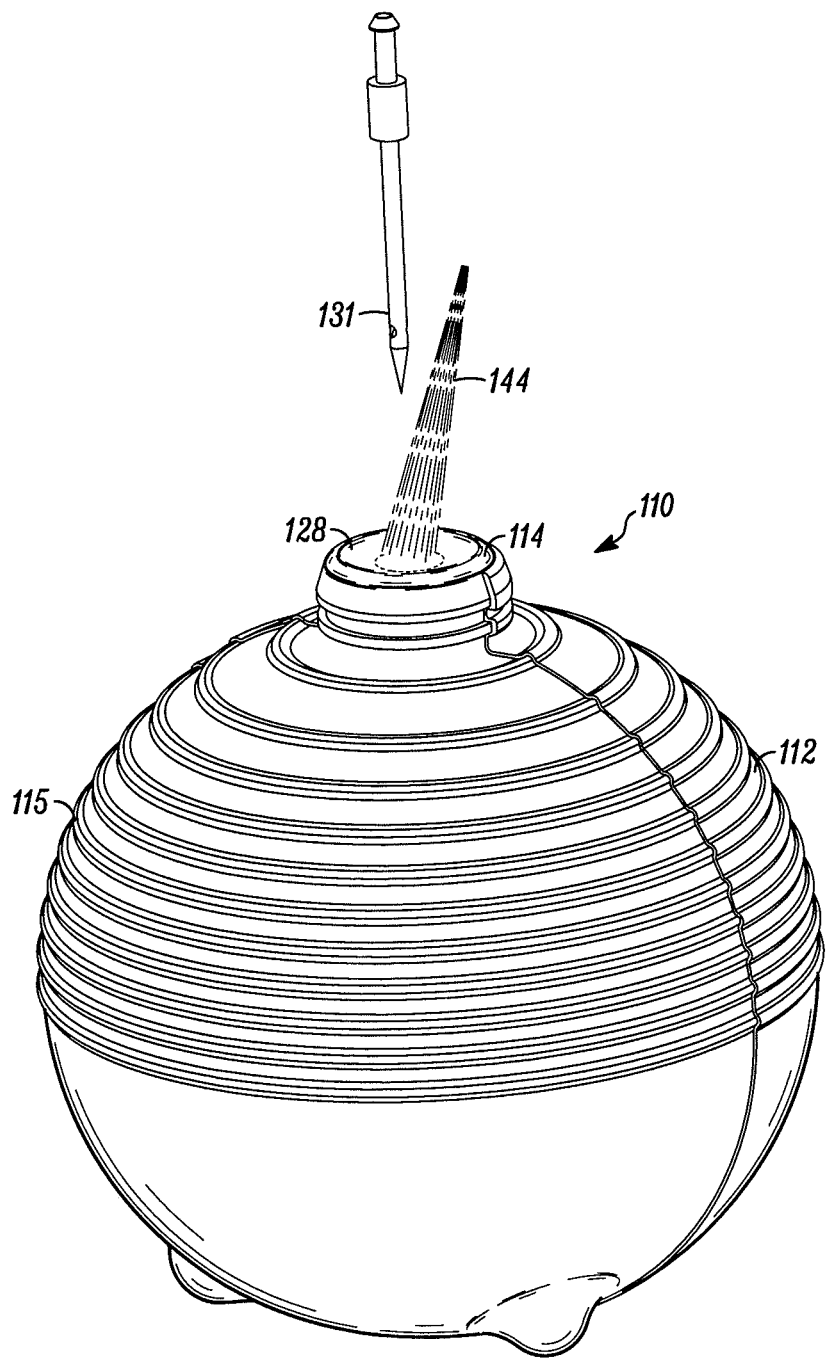
FIG. 8 is a perspective, partial cross-sectional view of the device of FIG. 2 illustrating the steps of laser resealing the resulting needle hole formed in the co-molded septum.

As shown best in FIGS. 7A-7E, the evacuated inner body 115 is sterile or aseptically filled with a fluid or desired product by the same needle or like injection member 131. Alternatively, a different needle or injection member may be employed. In either case, after evacuating (or otherwise drawing a desired amount of gas out of the chamber) the variable-volume storage chamber 116 of the inner bladder 115, the product is injected through the needle and into the storage chamber. In the illustrated embodiment, and as shown in FIG. 7E, when the inner bladder 115 is filled, it is expanded into contact, or substantially into contact, with the outer body 112. As shown in FIG. 8, and as described further below, after filling the inner bladder 115, the filling member 131 is withdrawn and the resulting penetration aperture is thermally resealed, such as by the application of laser radiation 144 thereto. As described further below, in the illustrated embodiments, the outer body 112, flexible inner body 115 and resealable portion 114 are co-extruded, and preferably are sequentially co-extrusion blow-molded. One advantage of this approach is that the molding process provides a sealed, empty, sterile device, such as a container, that is ready for aseptic filling, and such device does not require gamma or other sterilization of the product chamber prior to filling.

Figure 9:
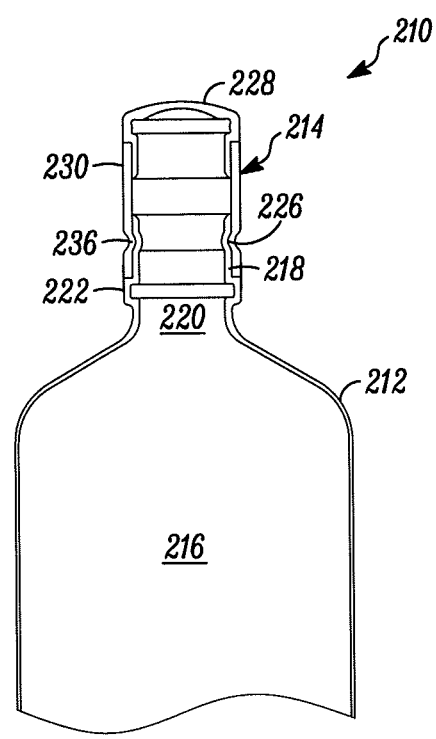
FIG. 9 is a partial, cross-sectional view of another embodiment of a device of the present invention including a co-molded body and closure, wherein the closure includes a penetrable and resealable septum for aseptically filling the sterile empty device.

Turning to FIG. 9, another embodiment of a device of the present invention is indicated generally by the reference numeral 210. The device 210 is substantially similar to the devices 10 and 110 described above, and therefore like reference numerals are preceded by the numeral "2," or preceded by the numeral "2" instead of the numeral "1," are used to indicate like elements. The device 210 is substantially similar to the device 10 described above in connection with FIGS. 1A and 1B, the primary difference being that the closure 214 includes a needle penetrable and thermally resealable septum 228 in the upper wall thereof. The septum 228 is provided for needle filling and thermally resealing, such as with laser radiation, as described above. In addition, the neck 218 of the body 212 defines an annular recess 226, and the depending flange 230 of the closure 214 defines a corresponding annular flange 236 that is received within the corresponding recess 226 of the neck. As a result, the closure interlocks with the neck to releasably retain the closure on the neck and form a hermetic seal therebetween. As with the embodiments described above, the components of the device 210 preferably are sequentially co-extrusion, blow molded to form in the mold a sealed, empty, sterile device. In the illustrated embodiment, the body 212 includes a first polymer and the closure 214 is defined by a resealable portion 240 and a base portion 241. Closure 214 defines a hermetic seal with body 212, hermetically sealing chamber 216, as described in the above embodiments. In addition, the resealable portion 228 includes a third polymer that is substantially bondable to the second polymer of the closure 214 to bond the resealable portion to the closure. Additionally, because the first polymer forming the neck 218 is substantially not bondable to the second polymer forming the flange 230 of the closure 214, the closure is removable from the body 212 when ready to dispense the product therefrom.

Figure 11C:
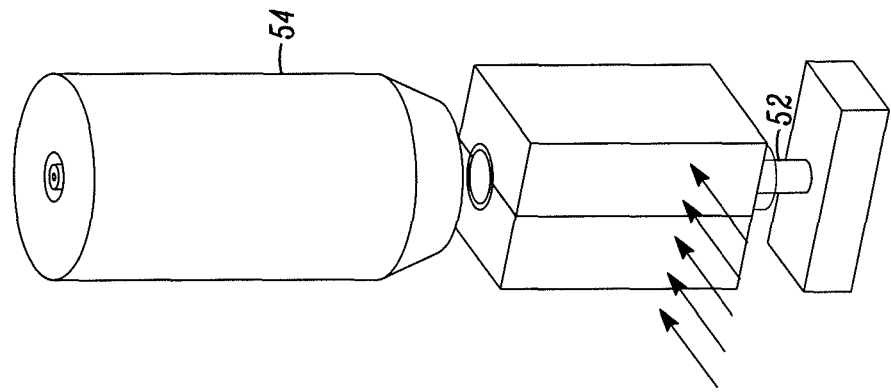
FIGS. 11A-11C are perspective views illustrating an apparatus for co-extrusion blow molding devices of the type disclosed herein, including an extrusion head for co-extruding a plurality of parisons of predetermined plastic materials for forming sealed, empty devices, mold halves mounted below the extrusion head and movable into engagement with each other and the co-extruded parisons for receiving the extruded plastic materials in their cavities, a blow pin in fluid communication with the interiors of the parison and cavities of the mold halves for blowing sterile filtered air therein and forming the sealed empty devices defining sealed empty sterile chambers, and a source of sterile filtered air or other gas that provides an over pressure of sterile gas horizontally, vertically, or otherwise over the surfaces involved in the molding processes.
Figure 11B:
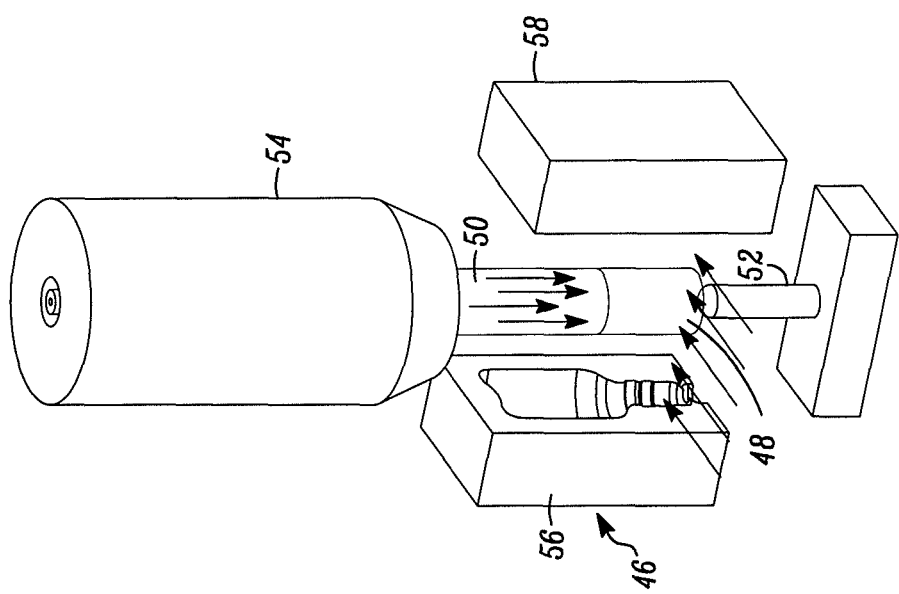
Figure 11A:
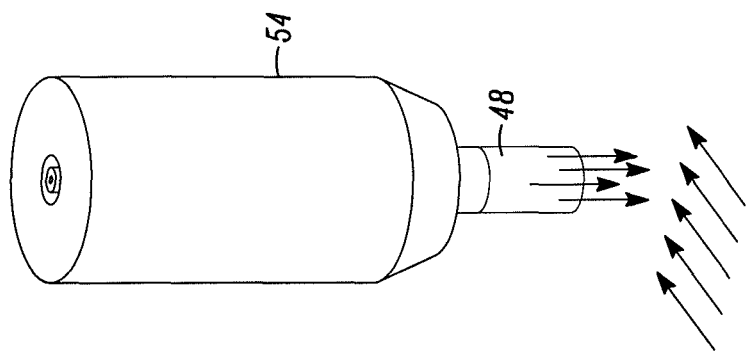

Turning to FIGS. 11A-11C, 12A, 12B and 13, an exemplary co-extrusion blow molding apparatus and method is illustrated in further detail. In FIG. 11A, and in an exemplary embodiment, the body parison 48 is extruded from the extrusion head 54. As indicated by the multiple arrows in FIG. 11A, an overpressure of sterile air or other gas is directed laterally or horizontally over the extrusion and the mold surfaces that are adjacent to or receive the extrusion. If desired, an overpressure of sterile air or other gas can be directed through the parison as indicated by the downwardly directed arrows in FIG. 11A. In FIG. 11B, after a predetermined time or, alternatively, once the extruded body parison 48 reaches a predetermined length, the closure parison 50 is extruded from the extrusion head 54. Both parisons 48 and 50 form, in the illustrated embodiment, a hollow and tubular shape. As shown in FIG. 11B, the parisons are released into the mold 46, which is defined by two mold halves, 56 and 58, respectively. The blow pin 52 is located below the mold 46 and extrusion head 54 and is aligned with the parison(s) so that it is in fluid communication with interior of the parison(s) and the mold cavity. As shown in FIG. 11C, each of the mold halves 56 and 58 is moved laterally into engagement with each other and with the parisons, and the parisons are severed from the extrusion head 54. During these steps, the flow of sterile air is maintained, as indicated by the arrows in FIGS. 11B and 11C.

Figure 12B:
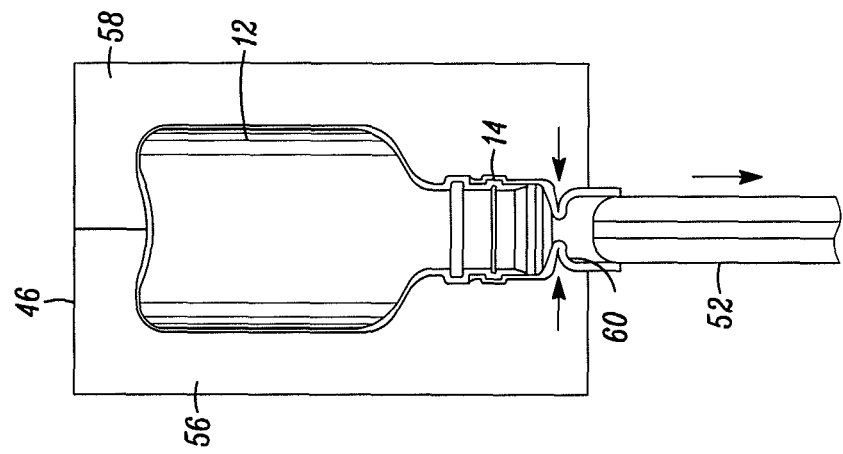
FIGS. 12A and 12B are cross-sectional views illustrating the mold in a closed condition, the blow pin injecting sterile air or other gas into the interior of the mold to blow the device into the shape of the mold, and a mechanism for pinching the blow pin hole after withdrawal of the blow pin to form the sealed, empty device defining a sterile interior chamber.
Figure 12A:
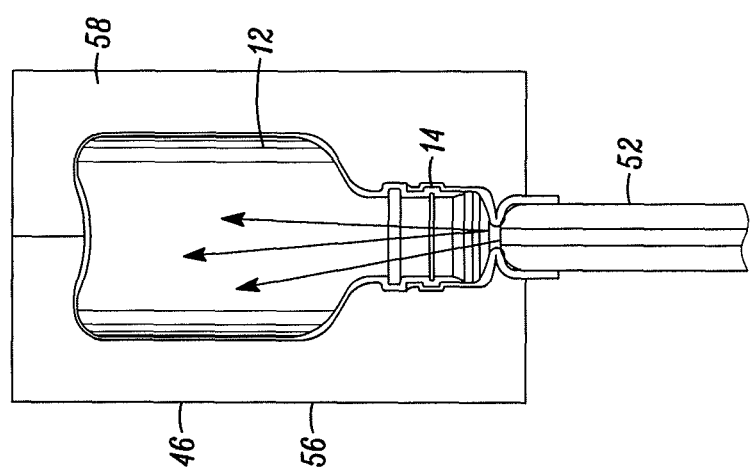
Figure 13:
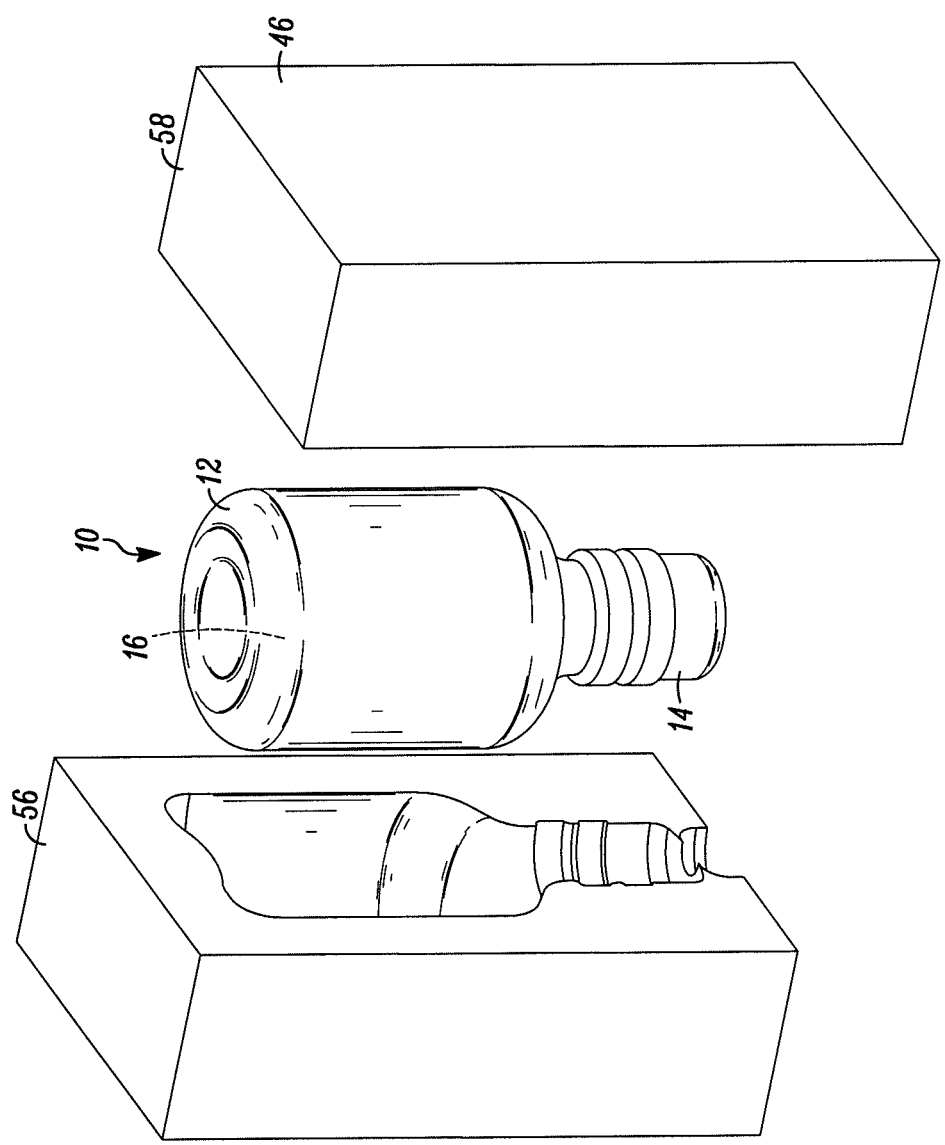
FIG. 13 is a perspective view illustrating release of the sealed, empty device from the mold.

As shown best in FIG. 12A, pressurized (and sterile) air is introduced into the hollow center of the parisons 48, 50 from the blow pin 52, expanding the parisons into the shape of the mold to, in turn, form, in the illustrated embodiment, the body 12 and closure 14, respectively. As shown in FIG. 12B, the blow pin 52 is removed and the material surrounding the aperture formed therefrom is pinched together via a clamp 60 while the device 10 is still relatively hot and pliable in order to seal the blow pin aperture (not shown). The device 10 is then allowed to cool to ambient temperature and, as a result, the differential shrinkage rates of the first and second polymers causes the closure 14 to shrink around the body 12 and form a hermetic seal therebetween. Next, as shown in FIG. 13, the mold 46 is opened, leaving the device 10 including a sealed, empty chamber 16 that is hermetically sealed with respect to ambient atmosphere.

Figures 14A, 14B:
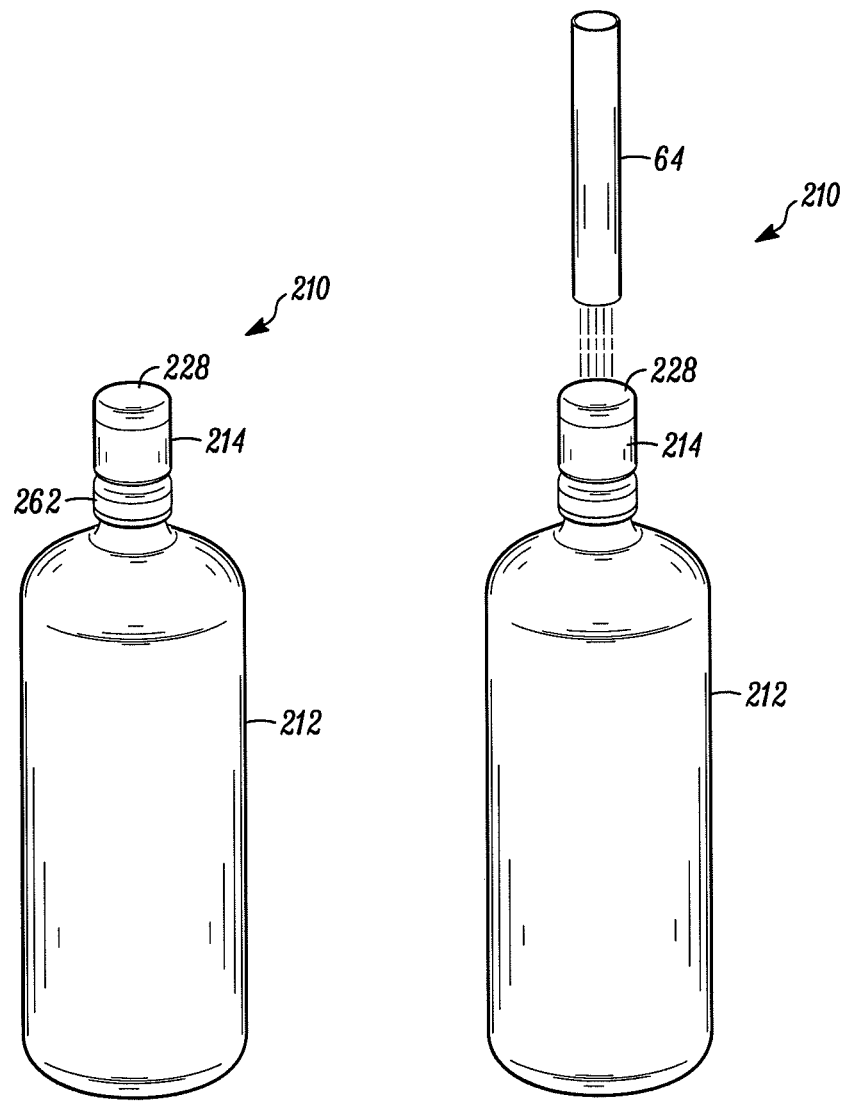
FIG. 14A is a perspective view of the device of FIG. 9 illustrating application of a tamper evident tape to the interface of the closure and body.
FIG. 14B is a perspective view of the device of FIG. 9 illustrating sterilization of at least the needle penetrable surface of the closure, such as by the application of VHP or other fluid sterilant, prior to aseptic filling therethrough.

As shown in FIG. 14A, in some embodiments, the device 10 further includes a tamper evident portion 62 surrounding the closure 14, which is applied after the device 10 is removed from the mold 46. In the illustrated embodiment, the tamper evident portion is a tape, shrink-wrap of other tamper evident seal that will break in the event the closure is opened, or otherwise if the seal between the closure and neck is broken.

Figure 10:
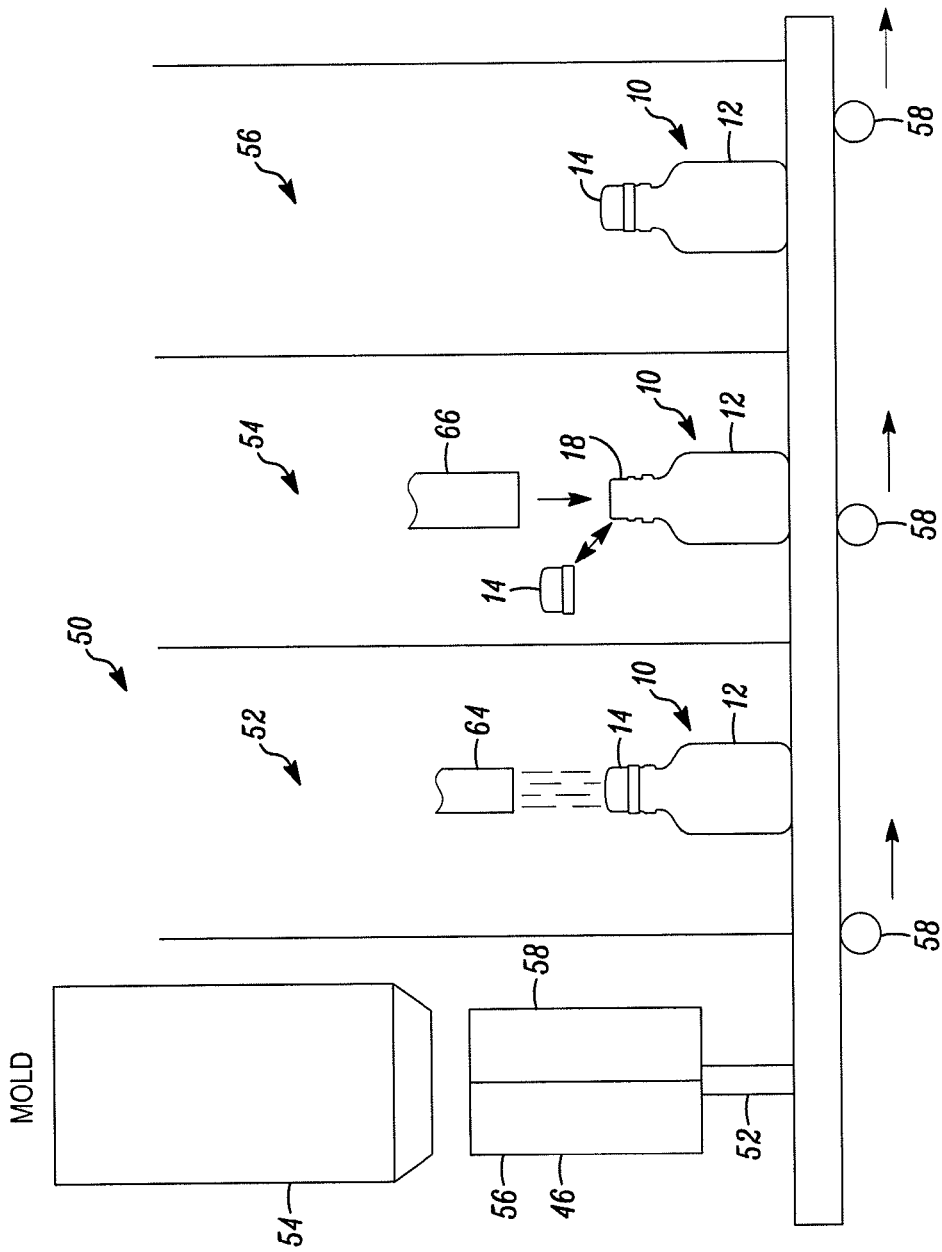
FIG. 10 is a schematic illustration of an apparatus of the present invention for sterile filling devices of the type disclosed herein.

Accordingly, and with reference to FIG. 10, the manufacture of the filled devices 10 described above in connection with FIGS. 1A and 1B includes the following steps:
1. Extrude the body 12 of the container 10.
2. Sequentially co-extrude the closure 14 (i.e., release the closure parison after initial release of the body parison) so that the closure 14 and body 12 overlap each other in the neck region 18 of the body 12. The container bodies 12 and closures 14 may be single layer materials or may be formed of multiple layer materials as is conventional in the art.
3. Terminate extrusion of the body 12 parison at the inlet to the neck 18, but continue to form the closure 14 to complete the portion of the closure above the neck.
4. Close the mold halves 56, 58 around the sequential, co-extruded body and closure.
5. Inject sterile filtered (micro-filtered) air or other gas through the blow pin 52 into the interior of the parisons and mold cavity to expand the co-extruded parisons into engagement with the cavity walls and, in turn, complete formation of the closed container defining a sealed, empty, sterile interior chamber 16.
6. Form the closure 14 and container body 12 of different thermoplastics that are not bondable to each other, and that define different shrinkage (or shrinkage rates). The plastic with the higher shrinkage is located on the outside so that it compresses against the inner layer of plastic and forms a hermetic seal therebetween. In the illustrated embodiment, the closure exhibits higher shrinkage and therefore surrounds the neck. If, on the other hand, the body exhibits higher shrinkage, the neck would surround the closure to form a hermetic seal therebetween.
7. Introduce the sealed empty sterile containers 10 (i.e., bodies 12 with closures 14 integrally molded thereto) into the filling machine 50.
   In a first station 52 (if necessary), sterilize the exteriors of the containers with, e.g., a fluid sterilant 64, such as VHP, or with radiation, such as ebeam, etc.
   In a second station 54, robotically or otherwise remove the closures 14 from the bodies 12 and sterile fill the chambers 16 through the necks 18. This stage can be performed under an overpressure of sterile air (e.g., downwardly directed flow, or laterally directed flow). A traditional filling cannula can be used to sterile fill through the open necks of the containers. Then, after filling, the closures 14 are re-attached to the necks 18 to seal the sterile filled products within the containers 10.
   As described above, the interface of the closure 14 and neck 18 is such that a hermetic seal is formed therebetween due to the compression created by the differential rates of shrinkage of the plural non-bondable thermoplastic layers upon cooling the molded part to ambient temperature. However, because the plural layers are not bondable to each other, the closure 14 can be mechanically removed from the neck (such as by a robotic arm or other automated fixture of a type known to those of ordinary skill in the pertinent art) to fill the body, and then is re-attached to the neck after sterile filling with the same fixture to, in turn, seal the sterile filled product within the container. In use, the product is dispensed by gripping the closure 14 by hand and manually lifting or pivoting the closure away from the neck to remove the closure and expose the open neck.
8. After sterile filling and sealing, the sealed, sterile filled containers are discharged to an outlet station 56 of the filling machine. The outlet station 56 may include conventional quality control features, such as sensors for determining correct fill levels and/or leakage, devices for labeling, providing tamper evidence seals, etc.

Also with reference to FIG. 10, the manufacture of the filled devices 110, 210 include the following steps:
1. Extrude the body 112, 212 of the container 110, 210;
2. Sequentially co-extrude the inner bladder 115 and closure 114, or the closure 214, including the needle penetrable portions 128, 228 so that the inner and outer pari sons overlap at the select portion(s), e.g., in the neck regions 118, 218;

3. Terminate extrusion of the body 112, 212 parison at the inlet to be covered by the penetrable/resealable portion, but continue to form the penetrable/resealable closure over the inlet to body;
4. Close the mold halves 56, 58 around the co-extruded part 110, 210;
9. Inject sterile filtered (micro-filtered) air or other gas through the blow pin 52 into the interior of the parisons and mold cavity, expand the co-extruded parisons into engagement with the cavity walls and, in turn, complete formation of the closed container defining a sealed, empty, sterile interior chamber 116, 216.
5. Form the needle penetrable closure 128, 228 of elastomeric material, and form the container body 112, 212 of relatively rigid material that are bondable to each other upon molding to form a hermetic seal therebetween (i.e., the different materials bind together when blown, e.g., by having at least one common constituent). The elastic material of the closure typically exhibits a higher shrinkage than the relatively rigid or less flexible material of the body, such as PP (polypropylene) or PE (polyethylene)). Accordingly, the higher shrinkage closure may be located on the outside so that it compresses against the lower shrinkage body to facilitate bonding of the two materials and the formation of the hermetic seal therebetween. Alternatively, the higher shrinkage closure is configured to avoid stretching thereof or other undesirable stress in the part upon cooling same to ambient temperatures.
6. Introduce the sealed empty sterile containers 110, 210 (i.e., bodies 112, 212 with needle penetrable closures 128, 228 bonded thereto) into filling machine.

In a first station 52 (if necessary), sterilize the needle penetrable portions of the containers with, e.g., a fluid sterilant 64, such as VHP, or with radiation, such as ebeam, etc. As shown in FIG. 14B, in an exemplary apparatus, the first station 52 includes a sterilization apparatus 64 that sterilizes the device 10 with, for example, a fluid sterilant, such as vaporized hydrogen peroxide ("VHP"). In the event VHP is used, a heated gas is transmitted onto the surfaces of the device 10 to evaporate the fluid sterilant and, in turn, provide dry sterile bodies 12 for subsequent filling and sealing. If desired, other sterilizing mechanisms equally may be employed, such as ebeam, gamma or other irradiation.

Figure 15C:
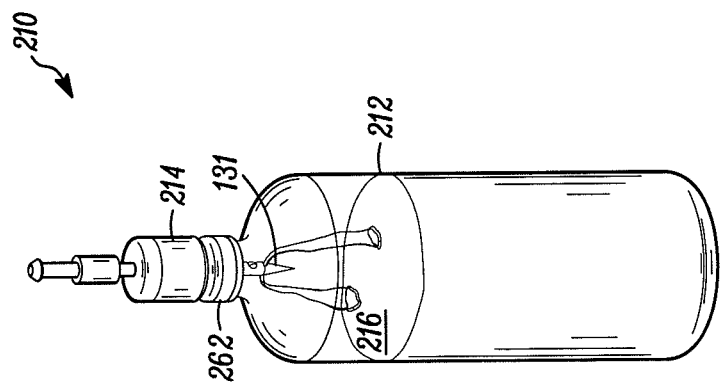
FIGS. 15A-15C are perspective views of the device of FIG. 9 illustrating the steps involved in aseptically filling the device through the penetrable septum and into the sterile chamber.
Figure 15B:
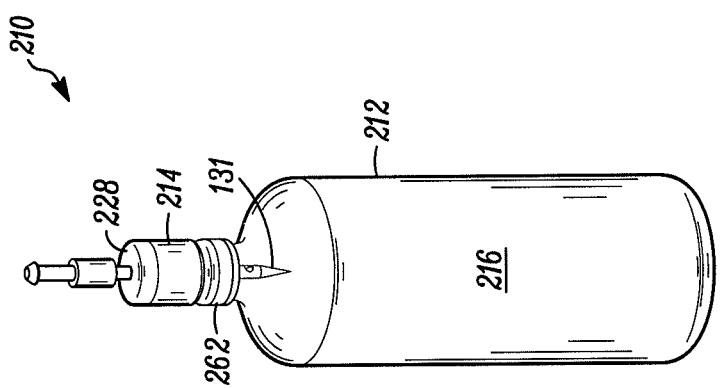
Figure 15A:
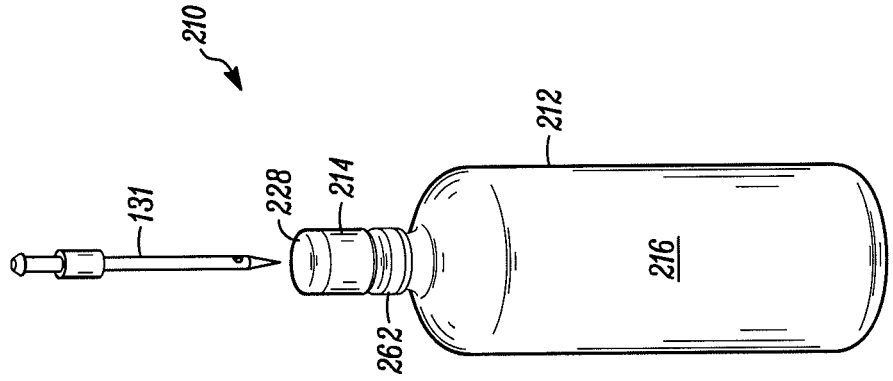

In a second station 54, evacuate, if necessary, and needle fill the sealed, empty containers through the elastomeric closures with the needle 131. This stage can be performed under an overpressure of sterile air (e.g., downwardly directed flow, or laterally directed flow). As shown in FIG. 15A, in the exemplary embodiment of the device 210, the filling step includes penetrating the penetrable and thermally resealable portion 228 with an injection member, such as the needle 131. As shown in FIG. 15B, the injection member 131 is thereby placed in fluid communication with the chamber 216. As illustrated in FIG. 15C, the chamber 216 is thereby filled with fluid through the injection member 131. As shown in FIGS. 16A and 16B, after the chamber 216 is filled, the needle 131 is withdrawn. Preferably, the penetrable septum 228 is self-sealing. However, as shown in FIG. 16B, if desired or otherwise required, the aperture may be thermally resealed, such as by applying laser energy 144.

As shown in FIG. 16C-17C, an over cap 270 may be fixedly secured to the closure 214. In one embodiment, the over cap 270 is thermally clamped to the closure 214 to fixedly secure the over cap to the closure and prevent tampering with the underlying penetrable septum 228. In the illustrated embodiment, the over cap 270 includes a pull-tab 272 to facilitate manual gripping of the over cap to, in turn, remove the over cap and closure fixed thereto when the product is ready for dispensing. As may be recognized by those of ordinary skill in the pertinent art based on the teachings herein, the over cap may take any of numerous different forms or configurations, and may be fixedly secured or otherwise attached to the closure, in any of numerous different ways, that are currently known, or that later become known. For example, in some embodiments, the needle penetrable material is sufficiently elastic to close itself after filling and removal of the needle. In these embodiments, the over cap may be fixedly secured to the body overlying the needle penetrated region to hermetically seal the container at that region.

In use, the user removes the tamper evident portion 262, and then grips and pulls the pull-tab 272. This motion substantially simultaneously removes the over closure 270 and the closure 214, and allows the user to dispense product from the chamber 216 through the neck 218 and aperture 220.

After sterile filling and sealing, the sealed, sterile filled containers are discharged to an outlet station 56 of the filling machine. The outlet station 56 may include conventional quality control features, such as sensors for determining correct fill levels and/or leakage, devices for labeling, providing tamper evidence seals, etc. As indicated schematically in FIG. 10, the apparatus 50 includes a motorized conveyor 50 for transporting the devices through the above-described stations.

As indicated above, the penetrable and thermally resealable portions 128, 228 allow filling therethrough of the chambers 116, 216 with a needle or like injection member 131, 231, and thermal resealing of the resulting penetration aperture, such as by applying laser radiation thereto. The devices 110, 210 may be filled and thermally resealed, or aseptically filled with other filling members and sealed within the containers or other devices, with any of numerous different apparatus in any of numerous different ways that are currently known, or that later become known, including any of the devices and apparatus and methods for filling disclosed in any of the following patent applications and patents that are hereby incorporated by reference in their entireties as part of the present disclosure: U.S. patent application Ser. No. 11/949,097, filed Dec. 3, 2007, entitled "Device with Needle Penetrable and Laser Resealable Portion and Related Method," similarly-titled U.S. patent application Ser. No. 11/933,300, filed Oct. 31, 2007, both of which are continuations of similarly-titled U.S. patent application Ser. No. 11/879,485, filed Jul. 16, 2007, which is a continuation of U.S. application Ser. No. 11/408,704, filed Apr. 21, 2006, entitled "Medicament Vial Having a Heat-Sealable Cap, and Apparatus and Method for Filling the Vial," now U.S. Pat. No. 7,243,689, which is a continuation of U.S. patent application Ser. No. 10/766,172 filed Jan. 28, 2004, entitled "Medicament Vial Having A Heat-Sealable Cap, And Apparatus and Method For Filling The Vial," now U.S. Pat. No. 7,032,631, which is a continuation-in-part of similarly titled U.S. patent application Ser. No. 10/694,364, filed Oct. 27, 2003, which is a continuation of similarly titled co-pending U.S. patent application Ser. No. 10/393,966, filed Mar. 21, 2003, which is a divisional of similarly titled U.S. patent application Ser. No. 09/781,846, filed Feb. 12, 2001, now U.S. Pat. No. 6,604,561, issued Aug. 12, 2003, which, in turn, claims the benefit of similarly titled U.S. Provisional Application Ser. No. 60/182,139, filed Feb. 11, 2000; similarly titled U.S. Provisional Patent Application No. 60/443,526, filed Jan. 28, 2003; similarly titled U.S. Provisional Patent Application No. 60/484,204, filed Jun. 30, 2003; U.S. patent application Ser. No. 11/933,272, filed Oct. 31, 2007, entitled "Sealed Containers And Methods Of Making And Filling Same," which is a continuation of similarly-titled U.S. patent application Ser. No. 11/515,162, filed Sep. 1, 2006, which is a continuation of similarly-titled U.S. patent application Ser. No. 10/655,455, filed Sep. 3, 2003, now U.S. Pat. No. 7,100,646, U.S. patent application Ser. No. 10/983,178 filed Nov. 5, 2004, entitled "Adjustable Needle Filling and Laser Sealing Apparatus and Method;" U.S. patent application Ser. No. 11/901,467, filed Sep. 17, 2007, entitled "Apparatus and Method for Needle Filling and Laser Resealing," which is a continuation of similarly-titled U.S. patent application Ser. No. 11/510,961, filed Aug. 28, 2006, which is a continuation of similarly-titled U.S. patent application Ser. No. 11/070,440 filed Mar. 2, 2005; U.S. patent application Ser. No. 11/074,513 filed Mar. 7, 2005, entitled "Apparatus for Molding and Assembling Containers with Stoppers and Filling Same;" U.S. patent application Ser. No. 11/074,454 filed Mar. 7, 2005, entitled "Method for Molding and Assembling Containers with Stoppers and Filling Same," U.S. patent application Ser. No. 11/339,966, filed Jan. 25, 2006, entitled "Container Closure With Overlying Needle Penetrable And Thermally Resealable Portion And Underlying Portion Compatible With Fat Containing Liquid Product, And Related Method;" and U.S. patent application Ser. No. 11/786,206, filed Apr. 10, 2007 entitled "Ready To Drink Container With Nipple And Needle Penetrable And Laser Resealable Portion, And Related Method;" U.S. patent application Ser. No. 11/650,102, filed Jan. 5, 2007, entitled "One-Way Valve, Apparatus and Method of Using the Valve," which is a continuation of similarly-titled U.S. patent application Ser. No. 11/295,274, filed Dec. 5, 2005, entitled; U.S. patent application Ser. No. 12/021,115, filed Jan. 28, 2008, entitled "Method of Using One-Way Valve and Related Apparatus," which is a continuation of U.S. patent application Ser. No. 11/295,251, filed Dec. 5, 2005, entitled "One-Way Valve, Apparatus and Method of Using the Valve."

As may be recognized by those of ordinary skill in the pertinent art based on the teachings herein, the devices may be filled via filling assemblies which take any of numerous different configurations that are currently known, or that later become known. For example, the filling assemblies may have any of numerous different mechanisms for sterilizing, feeding and/or aseptically filling the liquid components into the sealed empty chamber(s). In addition, rather than use a penetrable and resealable portion or cannula, the device may employ filling valves and filling members for filling through the filling valves as disclosed, for example, in the following patent and patent applications which are hereby incorporated by reference in their entireties as part of the present disclosure: U.S. application Ser. No. 12/025,362, filed Feb. 4, 2008, entitled "Dispenser and Apparatus and Method for Filling a Dispenser," which is a continuation of similarly-titled U.S. application Ser. No. 11/349,873, filed Feb. 8, 2006, which is a continuation of similarly-titled U.S. application Ser. No. 10/843,902, filed May 12, 2004, now U.S. Pat. No. 6,997,219, issued Feb. 14, 2006; U.S. application Ser. No. 11/938,103, filed Nov. 9, 2007, entitled "Device with Chamber and First and Second Valves in Communication Therewith, and Related Method," which is a divisional of U.S. application Ser. No. 10/976,349, filed Oct. 28, 2004, titled "Container and Valve Assembly for Storing and Dispensing Substances, and Related Method." In such alternative embodiments, a first valve is formed or otherwise mounted on the container in fluid communication with the storage chamber to fill the storage chamber therethrough. In addition, the container may include a second valve formed on or otherwise mounted on the container for allowing gas to flow out of the storage chamber during filling thereof, or to allow drawing or evacuation of gas from the storage chamber during filling thereof.

The term "sterile" should be understood to mean that the product in question complies with the respective microbiological standard prescribed for products of that type in national and international legislation. For example, the components in embodiments of the present invention can be rendered sterile by techniques which are explicitly designed to reduce or eliminate interactions and heat reactions of proteins and lipids, proteins and carbohydrates and/or to reduce damage to or decomposition of heat labile macro-and micronutrients, such as nucleotides, vitamins, probiotics, long chain polyunsaturated fatty acids, etc. A variety of suitable techniques is available. Some of these techniques rely on the application of heat (i.e., thermally sterilized), for example, such as retorting and aseptic processing. Other non-heat or "cold sterilization" techniques include, for example, bacterial filtration or microfiltration, high-pressure sterilization and irradiation. These techniques may be selected and combined as appropriate in the production of specific formulas or products according to the intended use of the formulas or products of the present invention.

As may be recognized by those of ordinary skill in the pertinent art based on the teachings herein, numerous changes and modifications may be made to the above-described and other embodiments of the present invention without departing from its scope as defined in the appended claims. For example, the polymers described herein, and the monomers forming each of the polymers, may take the form of any of numerous different polymers and/or monomers that are currently known, or that later become known, for performing the functions of the polymers and monomers as described herein. In addition, in some embodiments the closure 14 includes a polymer that has a higher shrinkage rate than the polymer of the body 12. In that instance, the closure 14 would fit within the neck of the body 12, rather than around it, so as to form an interference fit therebetween. In other embodiments, the closure 14 is not be removable from the body 12, either because it is fixedly secured thereto or because the first polymer of the body 12 is substantially bondable to the second polymer of closure 14. In addition, the devices may take any of numerous different configurations, and the components of the devices may take any of numerous different physical and/or chemical characteristics, that are currently known, or that later become known. For example, the shape of the body or closure may take on any form that is known or becomes known. Similarly, the stripe and slot may take on any shape or size for performing its function and the invertible portion(s) may be made in any shape that is known or becomes known for inversion, pliability or other purposes. For example, the invertible portion may include a relatively pliable polymer, and the relatively rigid portion may include a relatively rigid polymer that is bondable to the relatively pliable polymer. Similarly, the cap and nozzle may take the form of any of numerous different caps or nozzles that are currently known, or that later become known, for sealing and dispensing, respectively.

In the illustrated embodiment, the fluid flow aperture is in the nature of a bottle neck; however, as may be recognized by those of ordinary skill in the pertinent art based on the teachings herein, the fluid-flow aperture may take any of numerous different configurations that are currently known, or that later become known. For example, if desired, the fluid-flow aperture may include within it or otherwise be defined as a one-way valve, such as a check valve, to allow the contents of the chamber to self-regulate in response to pressure and/or temperature changes. Preferably, such as in the application of the device for food products, such as sterile foods, or medicinal products, the one-way valve substantially prevents the ingress of bacteria and other contaminants into the chamber 16 in both the closed and open positions (i.e., throughout storage and the period of dispensing of product from the device). Exemplary valve configurations that may be used in connection with the methods and apparatus of the present invention include those described in the following patent and patent applications which are hereby incorporated by reference in their entireties as part of the present disclosure: U.S. application Ser. No. 12/025,362, filed Feb. 4, 2008, entitled "Dispenser and Apparatus and Method for Filling a Dispenser," which is a continuation of similarly-titled U.S. application Ser. No. 11/349,873, filed Feb. 8, 2006, which is a continuation of similarly-titled U.S. application Ser. No. 10/843,902, filed May 12, 2004, now U.S. Pat. No. 6,997,219, issued Feb. 14, 2006; U.S. application Ser. No. 11/938,103, filed Nov. 9, 2007, entitled "Device with Chamber and First and Second Valves in Communication Therewith, and Related Method," which is a divisional of U.S. application Ser. No. 10/976,349, filed Oct. 28, 2004, titled "Container and Valve Assembly for Storing and Dispensing Substances, and Related Method."

In addition, the device may include any desired number of sealed empty chambers, including, for example, a first chamber for receiving one or more first liquid components, and a second chamber for receiving one or more second liquid components. In some such embodiments, the first and second chambers are initially sealed with respect to each other to maintain the first and second liquid components separate from each other during, for example, the shelf life of the product. Then, when the product is ready to be dispensed or used, the container includes a mechanism to allow the first and second chambers to be placed in fluid communication with each other to allow mixing of the first and second liquid components at the time of use, or shortly before use. Exemplary devices that may be used in connection with the methods and apparatus of the present invention include those described in the following patent applications, which are hereby incorporated by reference in their entireties as part of the present disclosure: U.S. Provisional Patent Application Ser. No. 60/983,153, filed Oct. 26, 2007, entitled "Ready to Feed Container with Drinking Dispenser and Sealing Member, and Related Method;" U.S. patent application Ser. No. 11/339,966, filed Jan. 25, 2006, entitled "Container Closure With Overlying Needle Penetrable And Thermally Resealable Portion And Underlying Portion Compatible With Fat Containing Liquid Product, And Related Method;" U.S. patent application Ser. No. 11/786, 206, filed on Apr. 10, 2007, entitled "Ready to Drink Container with Nipple and Laser Resealable Portion, and Related Method," which claims priority to similarly-titled U.S. Provisional Patent Application Ser. No. 60/790,684, filed Apr. 10, 2006; U.S. Provisional Patent Application Ser. No. 60/981,107, filed Oct. 11, 2007, entitled "Container Having a Closure and Removable Resealable Stopper for Sealing a Substance Therein and Related Method."

Furthermore, the devices and methods may be used to store and dispense any of numerous different products or substances, including without limitation, food products, such as low acid food products, dairy, milk-based, soy-based, water-based, juice-based or other food products, and pharmaceutical, ophthalmic, dermatological, and vaccine products, and industrial products, such as paints, adhesives, and components of the foregoing products. Although the devices and methods disclosed herein are particularly suited for storing and dispensing sterile products that should be maintained sterile and hermetically sealed with respect to ambient atmosphere during storage and throughout the period of dispensing product from the device, they equally may be used with other products that are not sterile, or that do not require that the product be hermetically sealed with respect to ambient atmosphere.

Accordingly, this detailed description of the currently preferred embodiments is to be taken in an illustrative as opposed to a limiting sense.

What is claimed is:

1. A device comprising:
a body including a first polymer and defining a chamber; and
a closure including a second polymer that is substantially not bondable to the first polymer at blow molding conditions for the first polymer and the second polymer and subsequent cooling of the first polymer and the second polymer to ambient temperature such that, after said cooling, the body including the first polymer and the closure including the second polymer are detachable from each other; wherein at least one of the first and second polymers exhibits a higher shrinkage rate relative to the other; and at least a portion of the closure overlaps at least a portion of the body, forming a hermetic seal therebetween, and defining a sealed, empty, sterile chamber within the body.

2. A device as defined in claim 1, wherein the body and closure are co-extruded.

3. A device as defined in claim 2, wherein the body and closure are co-extrusion blow-molded.

4. A device as defined in claim 1, wherein the closure includes a pierceable and resealable member.

5. A device as defined in claim 4, wherein the pierceable and resealable member includes a third polymer that is bondable to the second polymer of the closure.

6. A device as defined in claim 1, wherein the body defines a first portion including the first polymer and further comprises a third portion including a third polymer that is relatively flexible in comparison to the first polymer and is substantially not bondable to the first polymer, and a chamber that is hermetically sealable with respect to ambient atmosphere and defined by at least one of (i) an interior of the third portion, and (ii) a space formed between the first and third portions.

7. A device as defined in claim 6, wherein the device further comprises a one-way valve fixedly secured to at least one of the body and the closure and in fluid communication with an interior of the body, and the one-way valve defines a normally closed position that hermetically seals the chamber with respect to the ambient atmosphere, and an open position that allows substance to flow out of the body and device through the one-way valve.

8. A device as defined in claim 7, wherein the one-way valve substantially prevents the ingress of bacteria and other contaminants into the chamber in both the closed and open positions.

9. A device as defined in claim 8, wherein the one-way valve includes a flexible valve member that is movable from the closed to the open position in response to substance at an inlet to the one-way valve exceeding a valve opening pressure.

10. A device as defined in claim 4, wherein the pierceable and resealable member is thermally resealable upon the application of laser energy or radiation thereto.

11. A device comprising:
a body including a first polymer; and
a closure including a second polymer that is substantially not bondable to the first polymer at blow molding conditions for the first polymer and the second polymer and subsequent cooling of the first polymer and the second polymer to ambient temperature such that, after said cooling, the body including the first polymer and the closure including the second polymer are detachable from each other, and said closure defining a penetrable and resealable portion co-extrusion blow molded with the body, wherein the body and the closure cooperate to define a sealed, empty, sterile chamber.

12. A device as defined in claim 11, wherein at least one of the first and second polymers exhibits a higher shrinkage rate relative to the other; and at least a portion of the closure overlaps at least a portion of the body, forming a hermetic seal therebetween.

13. A device as defined in claim 11, wherein the penetrable and resealable portion is thermally resealable upon the application of laser energy or radiation thereto.

14. A method comprising the following steps:
extruding a body including a first polymer;
co-extruding with the body a closure that includes a second polymer that is substantially not bondable to the first polymer, wherein at least one of the first and second polymers exhibits a higher shrinkage rate relative to the other; and
blow molding the co-extruded body and closure and forming therein an empty, sterile chamber that is sealed with respect to ambient atmosphere.

15. A method as defined in claim 14, further comprising cooling the blow molded body and closure and inducing shrinkage of the first and second polymers and, in turn, forming a hermetic seal therebetween.

16. A method as defined in claim 14, further comprising co-extruding a third portion including a third polymer that is bondable to the second polymer.

17. A method as defined in claim 16, further comprising co-extrusion blow molding the first, second and third portions.

18. A method as defined in claim 14, further comprising sequentially co-extruding the first and second polymers.

19. A method as defined in claim 14, further comprising extruding a first parison of the first polymer and sequentially co-extruding a second parison of the second polymer surrounding the first parison.

20. A method as defined in claim 16, further comprising sequentially co-extruding the first, second and third polymers and, in turn, fixedly securing the first and second portions to each other and bonding the third polymer to the second polymer.

21. A method as defined in claim 14, further comprising aseptically filling the sealed, empty, container with a sterile fluid.

22. A method as defined in claim 21, wherein the sterile fluid is at least one of a food and a medicine.

23. A method as defined in claim 22, wherein the food is at least one of a milk-containing product, a soy-containing product, a non-dairy creamer, a yogurt-containing product, a fat-containing product, a nutritional supplement containing product, and a low acid product.

24. A method as defined in claim 21, wherein the aseptic filling includes needle penetrating a penetrable portion of the device with an injection member and aseptically filling the chamber through the injection member.

25. A method as defined in claim 24, wherein the aseptic filling further includes resealing a resulting fill hole.

26. A method as defined in claim 21, wherein the aseptic filling includes (i) detaching the closure from the body, (ii) filling the chamber with a fluid through a cannula, and (iii) re-attaching the closure to the body, and wherein steps (i) through (iii) are performed under an overpressure of sterile gas.

27. A method as defined in claim 25, wherein the step of resealing a resulting fill hole includes thermally resealing the resulting fill hole by applying laser energy or radiation thereto.

28. A method as defined in claim 16, wherein the third portion is a penetrable and resealable portion.

29. A method as defined in claim 28, wherein the third polymer is bondable to the first and second polymers.

30. A method as defined in claim 28, wherein the penetrable and resealable portion is thermally resealable upon the application of laser energy or radiation thereto.

31. A device comprising:
a body including a first polymer and defining a chamber; and
a closure including a second polymer that is substantially not bondable to the first polymer;
wherein one of the first and second polymers exhibits a higher shrinkage rate relative to the other, and at least a portion of the polymer that exhibits said higher shrinkage rate overlaps on the outside of at least a portion of the other polymer to form a hermetic seal therebetween where the first polymer and the second polymer overlap, whereby the body and the closure define a sealed, empty, sterile chamber within the body.

32. A device as defined in claim 31, wherein the polymer that overlaps on the outside compresses against the other polymer to form said hermetic seal.

* * * * *